Oct. 30, 1962 G. ARICI 3,061,190
LOGARITHMIC COMPUTING MACHINE
Filed Oct. 24, 1955 8 Sheets-Sheet 1
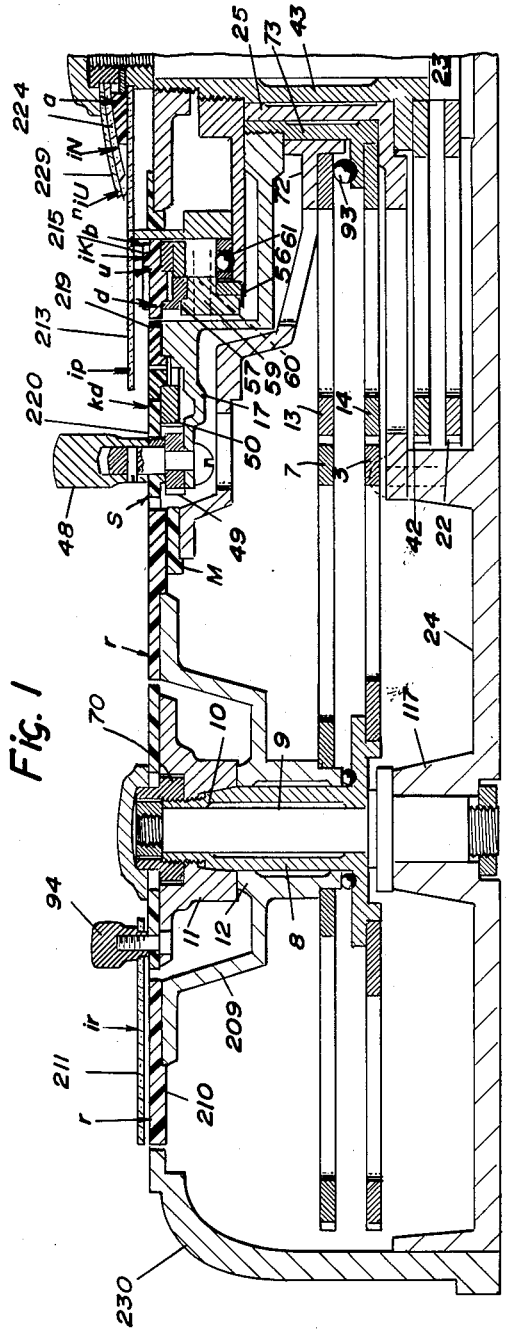
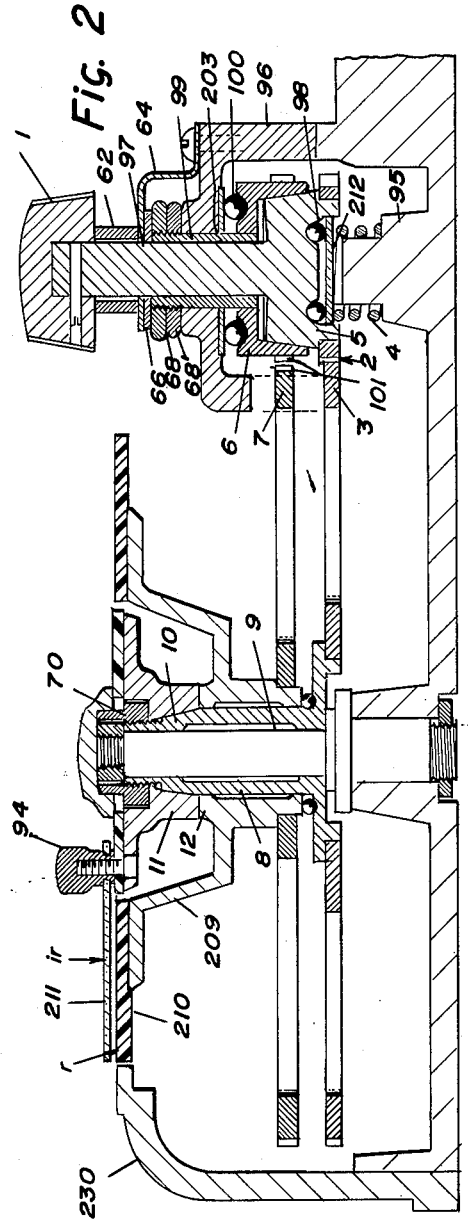
INVENTOR
Giuseppe Arici
by Wenderoth, Lind & Ponack
Attorneys

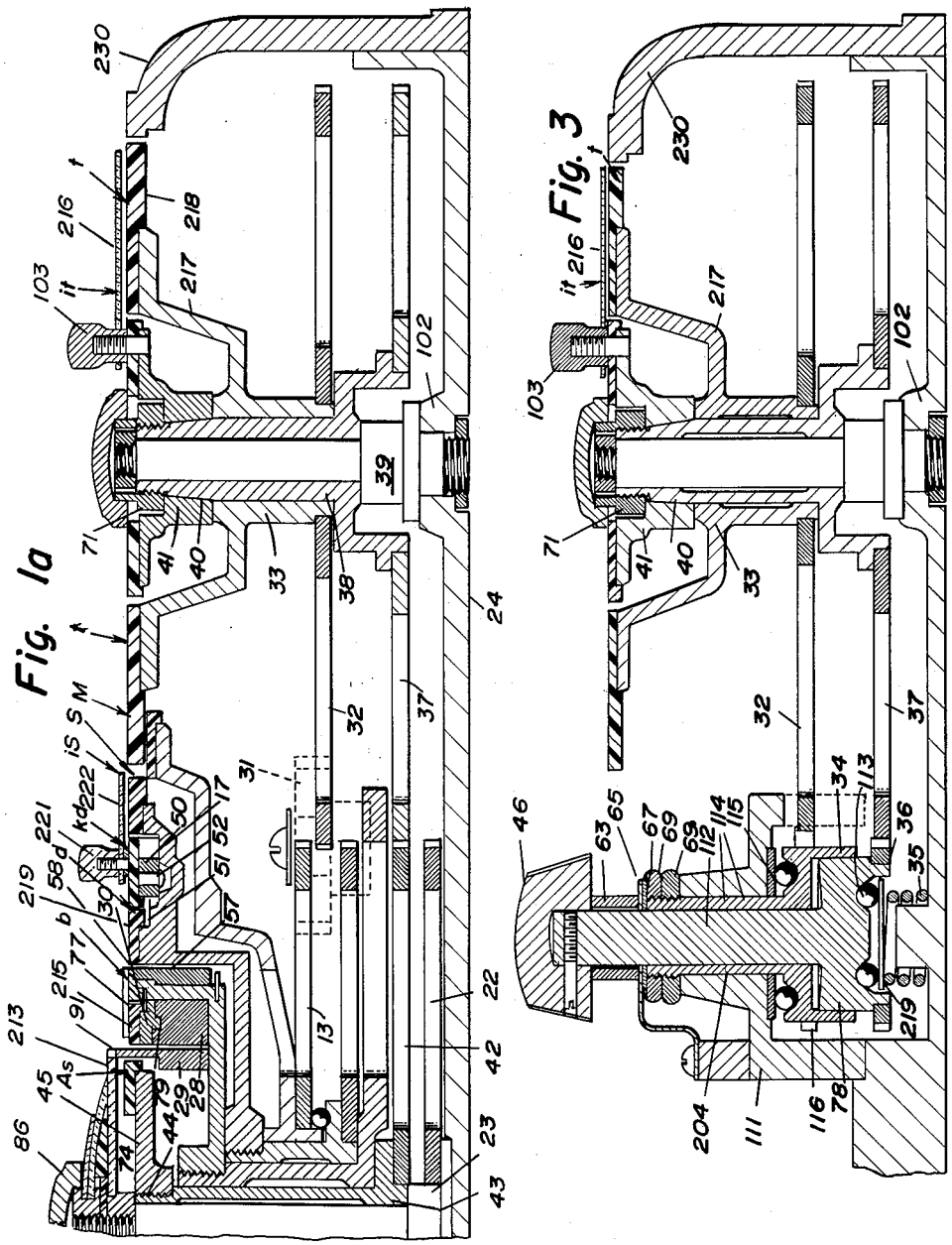

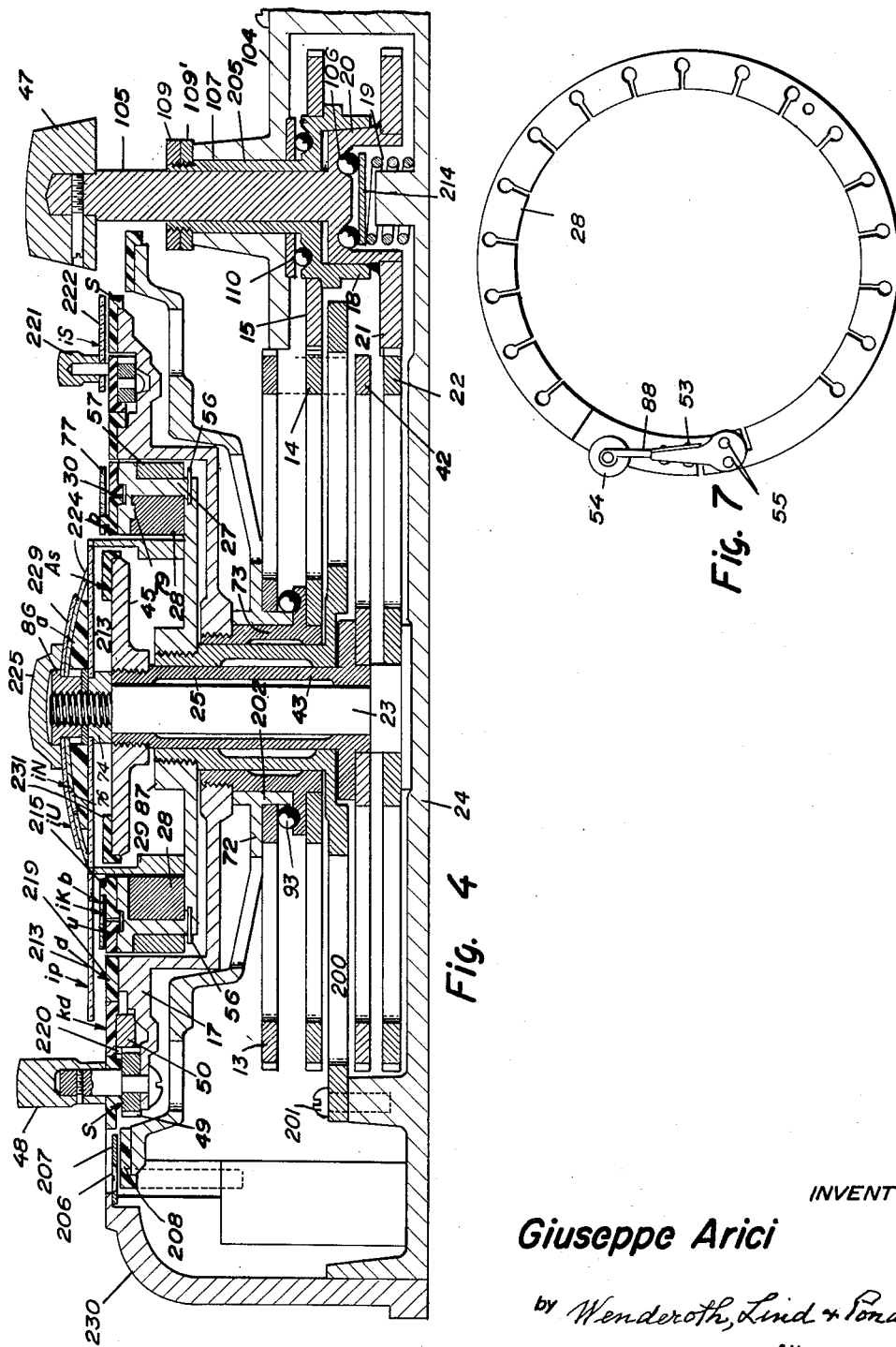

Oct. 30, 1962  G. ARICI  3,061,190
LOGARITHMIC COMPUTING MACHINE
Filed Oct. 24, 1955  8 Sheets-Sheet 4
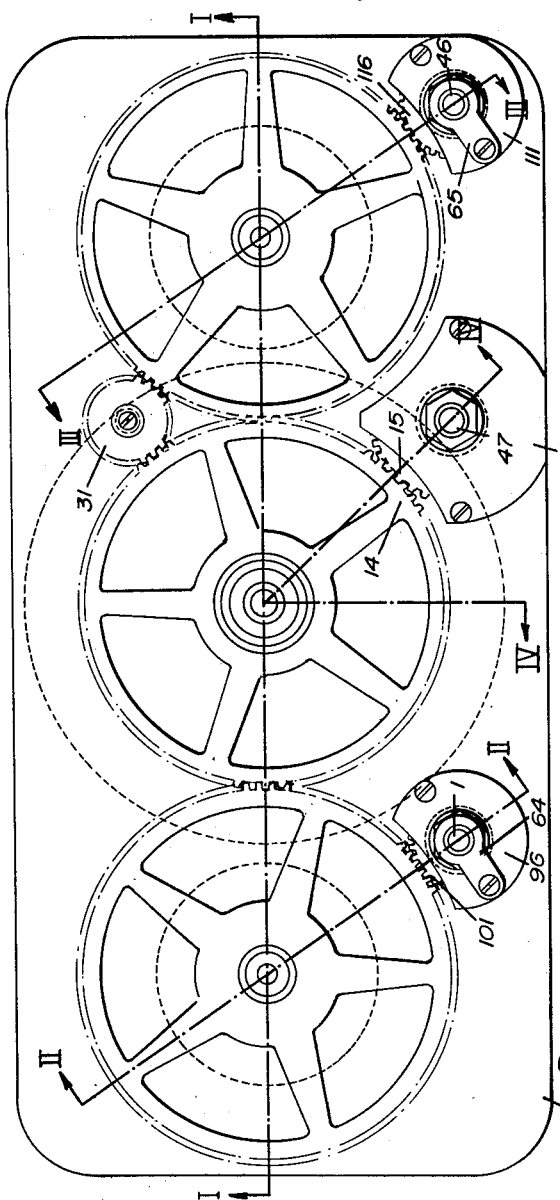
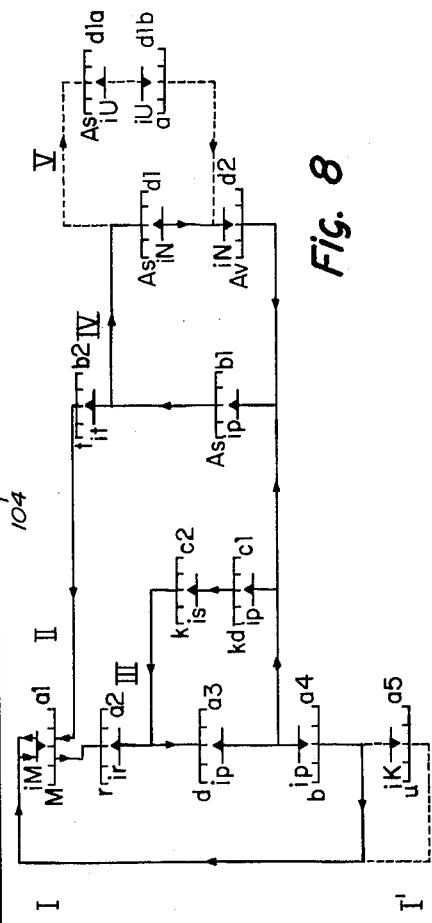
INVENTOR
*Giuseppe Arici*
by *Wenderoth, Lind & Ponack*
Attorneys Oct. 30, 1962  G. ARICI  3,061,190
LOGARITHMIC COMPUTING MACHINE
Filed Oct. 24, 1955  8 Sheets-Sheet 5

INVENTOR
Giuseppe Arici
by Wenderoth, Lind & Ponack
Attorneys

Oct. 30, 1962   G. ARICI   3,061,190
LOGARITHMIC COMPUTING MACHINE
Filed Oct. 24, 1955   8 Sheets-Sheet 6

INVENTOR
Giuseppe Arici
by Wenderoth, Lind & Ponack
Attorneys

Oct. 30, 1962   G. ARICI   3,061,190
LOGARITHMIC COMPUTING MACHINE
Filed Oct. 24, 1955   8 Sheets-Sheet 7

INVENTOR
Giuseppe Arici
by Wenderoth, Lind & Ponack
Attorneys

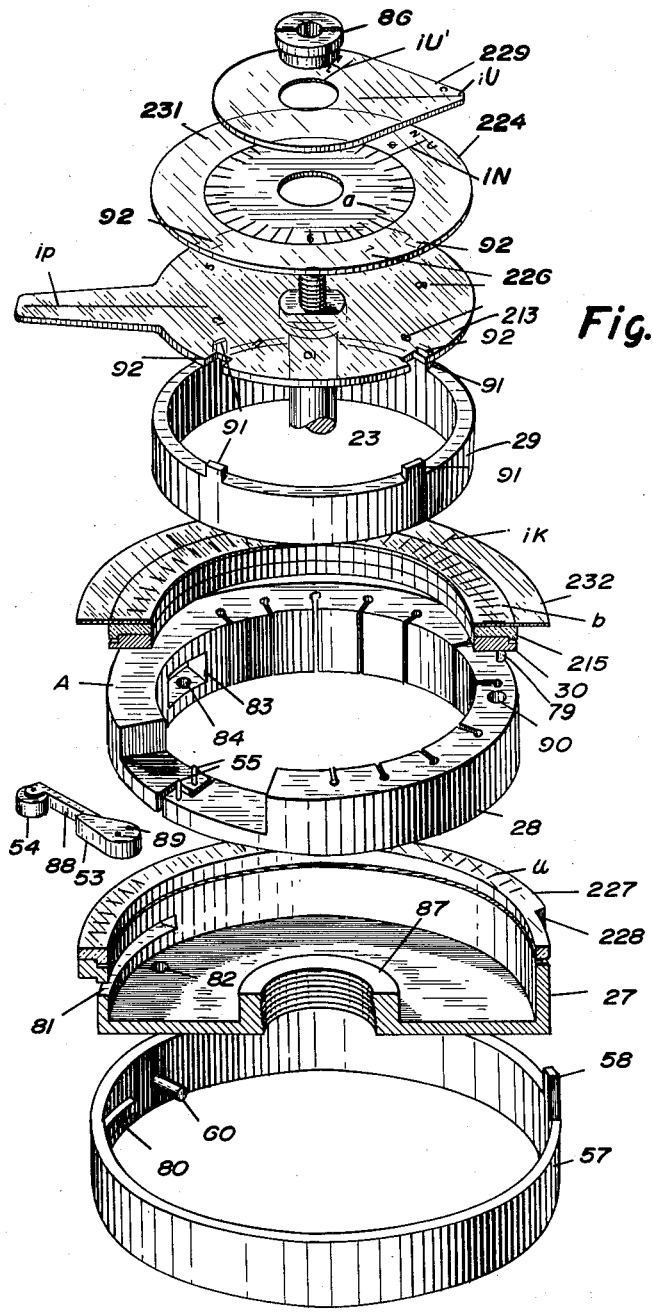

United States Patent Office 3,061,190
Patented Oct. 30, 1962

3,061,190
LOGARITHMIC COMPUTING MACHINE
Giuseppe Arici, 50 Via Borrelli, Palermo, Italy
Filed Oct. 24, 1955, Ser. No. 542,409
9 Claims. (Cl. 235—84)

The present invention relates to a logarithmic calculating machine particularly suitable for calculations in reinforced concrete structures.

Logarithmic calculating machines are known which solve equations of the type $a.b.=c$, wherein $b$ includes $1/b$ and sometimes $b^2$ or $b^3$ or in general any function of $b$. There also are known more complex calculating machines which execute operations between three terms some of which may be in turn a function of variables, so as to solve equations of the general type $$f(a).f(b).f(c)=f(d)$$

When calculations are to be executed wherein the variables are bound to each other not only through one equation but through a plurality of equations, it is in general necessary to use repeatedly the machine for a first equation or at least repeatedly for one equation after the other, and it is therefore necessary that the operator have always at hand the equations and in the case that a variable is present in several equations it will be necessary to perform a controlled movement to introduce in the relative scale a variable as many times as there are equations which contain the said variable. If, for example, a variable $a$ is contained in four equations, the operator has to introduce the factor $a$ (duly varied according to whether the said factor is in the numerator or in the denominator, squared, or cubed etc.) four times.

Moreover, if the number of equations which bind several variables is less than the number of the said variables, the system of equations bears numberless solutions. If it is desired to select among these solutions that one which is more suitable, the operator having to solve the several equations one after the other may read the succession of the corresponding values only for two variables in a single equation; the first one. For the values assumed by the other variables in connection with the other equations it will not be possible to read the numberless succession of values corresponding to the numberless pairs of values of the two first variables.

An object of the invention is to provide a logarithmical calculating machine particularly arranged for previously determined pluralities of equations, which are dependent therebetween owing to factors appearing in more than one equation. The operator is able, at the same time during which he controls the variation of any desired factor, on the respective scale, to see also the corresponding variations of all the factors, which depend therefrom, in all the equations of the considered plurality. Also if the results of all the equations depend directly or indirectly upon the controlled factor, he is able to select the best combination, observing a succession of corresponding values (as close as desired) in a number of unknowns equal to the number of equations plus one.

To accomplish the above object the calculating machine comprises a plurality of logarithmic slide rules cooperating with one another. The elementary structural features common for all known logarithmical slide rules will be briefly reviewed.

Every known slide rule may be considered as a succession of "indicating element pairs," each "indicating element pair" being formed of two elements movable with respect to one another. One element has a logarithmical scale and the other a hair line indicator. The second element of every "indicating element pair" moves simultaneously with the first element of the subsequent "indicating element pair" and the second element of the last "indicating element pair" is rigidly connected with the first element of the first "indicating element pair." Such a succession of "indicating element pairs," referred to below briefly as "indicating pairs," is used generally for adding on to one indicating pair the displacement indicated on the remaining indicating pairs. In more general terms, in such a succession of indicating pairs the mutual displacement of the first and second element of any desired indicating pair is equal to the algebraical sum of the displacement indicated in each of the remaining indicating pairs.

Also, the calculating machine comprises a first slide rule, for the first equation of the considered plurality, having its own succession of indicating pairs, each of them being established for each factor of the equation, including the factor representing the result. Said indicating pairs have the element carrying the hair line and the element carrying the corresponding logarithmical scale thereof normally locked with one another by their own inertia or by suitable means, in any relative position into which they are brought by the operator.

As the said locking means are disengaged in two indicating pairs selected by the operator, he can see contemporaneously the corresponding variations of any desired factor and another desired factor of the equation, selected as the result by the operator.

To the first slide rule there is coupled a second slide rule cooperating with the same and provided for a second equation of the plurality of equations and having a second succession of indicating pairs in a number corresponding to the number of factors of said second equation. In the second succession there is comprised those indicating pairs of the first slide rule which are established for those factors of the first equation which are also comprised in the second equation. This is attained by the fact that the second element of an indicating pair, assigned to a factor common to the first and second equation, transfers its movement to the first element of the subsequent indicating pair of the first succession of indicating pairs and simultaneously also to the first element of the subsequent indicating pair of the second succession of indicating pairs.

The variations of exponent of the one and same factor in the first and second equations are provided by the established extent and direction of the scales in cooperation with means transferring the movement from the second element of a common indicating pair to two first elements of two different subsequent indicating pairs, pertaining respectively to the first and second slide rule.

Therefore, we can say that said transferring means form branching off points between the second and first slide rule. Consequently, the second slide rule will be defined afterwards as "branched off" on the first one.

Said second slide rule, branched off on the first one, has also said means for locking the scale with the hair line of each indicating pair.

Likewise additional cooperating slide rules are branched off on the first slide rule or on slide rules in turn branched off on the first slide rule, one for each equation of the plurality considered.

In this way, if the indicating pair of the first slide rule, pertinent to the factor controlled by the operator, or that assigned to the factor of the first slide rule selected as a result, is common also for other slide rules, the displacement thereof will be transferred simultaneously to the indicating pairs, selected as result in said other slide rules and in turn from those to other slide rules in which the factors selected as a result depend, even though indirectly, upon the controlled factor for all the equations of the plurality considered.

The calculating machine applies the above principles to some pluralities of equations used for calculating projects of reinforced concrete structures with the advantage of greater rapidity of calculation, greater safety from errors, the possibility (hitherto unknown) of solving for one and the same problem an infinite range of possible projects having all the necessary values, instead of two values as hitherto known, thereby permitting the proper selection of the most suitable project.

With these and other objects in view, the present invention consists in the combination and arrangement of parts, as will be hereinafter more fully described and illustrated in the accompanying drawings, and particularly pointed out in the appended claims, it being understood that changes in the form, proportion, size and minor details may be made, within the scope of the claims without departing from the spirit or sacrificing any of the advantages of the invention.

In the drawings:

FIGURES 1 and 1a are a vertical section taken along section line I—I of FIG. 5;

FIGURE 2 is a vertical section taken along section line II—II of FIG. 5;

FIGURE 3 is a vertical section taken along section line III—III of FIG. 5;

FIGURE 4 is a vertical section taken along section line IV—IV of FIG. 5;

FIGURE 5 is a top view of the calculating machine of FIGURES 1 and 1a, the upper part being removed;

FIGURE 7 is the plan view of a detail;

FIGURE 7a is an exploded view of the central part of FIG. 6a;

FIGURE 8 is a diagrammatic representation of the slide rules forming the calculating machine.

Figure 6:
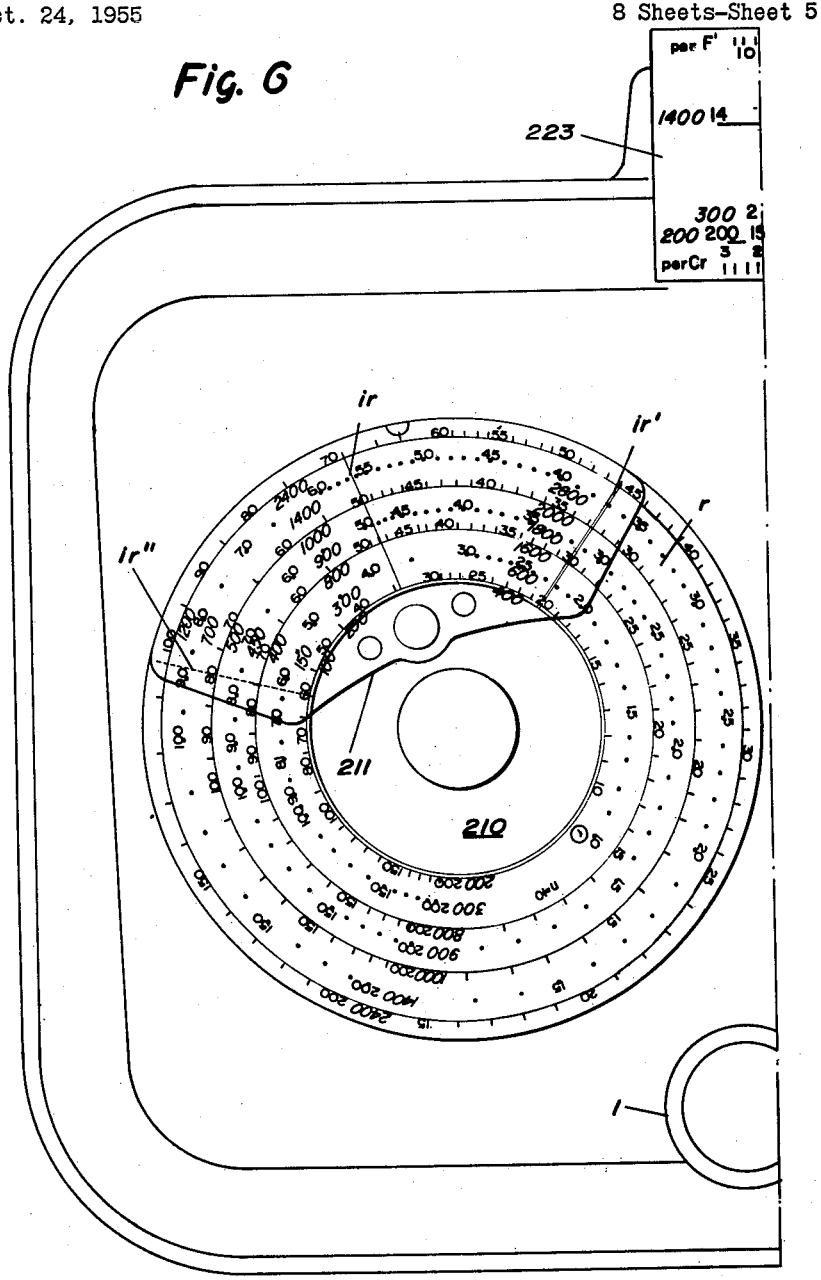
FIGURES 6, 6a and 6b are top views of the calculating machine showing the complete top with the graduated scales.

Before beginning the detailed description of the calculating machine the principal equations are set forth which form the basis of the calculation of a reinforced concrete structure. The manner whereby these equations are derived are generally known by those skilled in the art.

The main equations which connect the various factors are:

$$b = r^2 M \frac{1}{d^2} \qquad (1')$$

$$As = rt \frac{M}{d} \qquad (2')$$

$$kd = k \cdot d \qquad (3')$$

$$N = \left(3\frac{M}{jd}\right)\left(\frac{1}{Av4/5fs}\right) \qquad (5'')$$

this last transformed in $$N = \frac{3As}{4/5Av} \qquad (5''')$$

The same symbols are used as those of the American Concrete Institute in its "Reinforced Concrete Design Handbook."

In addition expressions are used which are more closely pertinent to the construction and the use of the present calculating machine.

In the above equations for the calculation of a reinforced concrete beam having a rectangular section there are the following factors:

$b$ base or width of the beam;
$d$ depth
$As$ area of the tensile reinforcement
$kd$ distance from the neutral axis of the compressed fibers $N$ number of the stirrups to be inserted in the beam
$M$ bending moment
$r$, $t$, $k$ are coefficients already calculated, which are a function of $n$ (ratio of the modulus of elasticity) $fc$ (inner unit stress of the concrete), $fs$ (inner unit stress of the tensile reinforcement)
$Av$ area of a stirrup
$j$ ratio of distance $(jd)$ between resultants of compressive and tensile stresses to effective depth=

$$1 - \frac{k}{3}$$

$$\left(k = \frac{n}{n + fs/fc}\right)$$

Referring now to the drawings the calculating machine comprises a base 24 (FIGS. 1, 1a, 2, 3, 4) having in the central part thereof a vertical hollow shaft 25 (FIG. 4) rigidly fixed by means of a flange 200 and screws 201. The hollow shaft 25 is disposed within a rotating hollow shaft 73, around which another hollow shaft 202 is rotatably mounted. Inwardly of the hollow shaft 25 a rotating hollow shaft 43 is arranged wherein a solid shaft 23 is rotatably mounted.

In a socket 117 (FIGS. 1, 2) provided at the left-hand portion of the base 24 a solid vertical shaft 9 is arranged, extending in a hollow shaft 8, which in turn is rotatably mounted in a rotating hollow shaft 12.

In a socket 102 (FIGS. 1a, 3) provided at the right-hand portion of the base 24 a stationary vertical shaft 39 is arranged, extending in a hollow shaft 38, which in turn is rotatably mounted in a rotating hollow shaft 33.

The base 24 carries, in the position shown in FIG. 5, a stationary support 96 (FIG. 2), having at its upper portion a vertical cylindrical bore 203, in which a hollow shaft 99 is rotatably mounted, inwardly of which a rotatably solid shaft 97 is arranged.

The base 24 carries, in the position shown in FIG. 5, a stationary support 111 (FIG. 3), having at its upper portion a vertical cylindrical bore 204 in which a hollow shaft 114 is rotatably mounted, inwardly of which a rotatably solid shaft 112 is arranged.

The base 24 carries, in the position shown in FIG. 5, a stationary support 104 (FIG. 4), having at its upper portion a vertical cylindrical bore 205, in which a hollow shaft 107 is rotatably mounted, inwardly of which a rotatable solid shaft 105 is arranged.

The following explanation will be better understood bearing in mind the first equation of the considered plurality of equations:

$$b = r^2 M \frac{1}{d^2} \qquad (1')$$

which advantageously may be rewritten in the following form:

$$M r^2 \frac{1}{d^2} = b$$

equivalent to:

$$\log M + 2 \log r - 2 \log d = \log b$$

A transparent plate 207 (FIGS. 4, 6a) is secured by means of screws 206, 206' to a projection of the base 24. The plate 207 is superposed upon a ring 208, on which a logarithmical scale M is engraved and which is placed below a casing 230 enclosing the calculating machine. Therefore, in FIG. 6a the contour of the plate 207, corresponding to the portion covered by the casing 230, is indicated with dashed lines.

Marked on the transparent plate 207 is a first hair line $iM$ (FIG. 6a), radially extending with respect to the central shaft 25.

Marked on the plate 207 is another radial hair line $iM'$, spaced apart from the hair line $iM$ so as to indicate the value 10 corresponding to value 12 indicated on the same logarithmic scale by the hair line *i*M. Therefore, the hair line *i*M' will be used for the English metric system.

The hollow shaft 202 (FIG. 4) is integral with a cup shaped element 72 (first rotatory element) and has fixed thereto a gear wheel 13. Secured to the outer edge of the cup shaped element 72 is a ring 208 of plastic material (FIG. 4) carrying a first logarithmic scale M (FIG. 6a) assigned to the factor M of the first Equation 1'. Said scale is a normal logarithmic scale and is "double," that is, a complete logarithmic scale (1 to 10) extends on a half circumference, while on the whole circumference there are two complete logarithmic scales (1 to 100). On the scale M instead of values 1 to 100 are marked two scales of values in the units generally used in the practice for this factor. A scale from 60,000 to 5,000,000 will be used with the hair line *i*M for the bending moment given in centimeter-kilograms, whereas the scale from 600 to 50,000 (FIG. 6a) serves with the same hair line *i*M for the bending moments given in meter-kilograms. For the countries using the English metric system this last scale will be from 6 to 500 for the bending moments given in foot-kips, employing the hair line *i*M', while the other scales will indicate in inches.

The submultiples, indicated on the outer edge of the scale M are abbreviated and are available for all the scales.

The direction of this scale will be termed "right-hand" direction since the values increase in clockwise direction, whereas the opposed direction will be termed "left-hand" direction.

The values of the factor M are indicated by the stationary hair-line *i*M (or *i*M') on the rotatory scale M and therefore the increasing values of M will be indicated when the scale M rotates together with its support 72 in left-hand direction (counterclockwise direction).

The hair line *i*M, marked on the stationary transparent plate 207 (FIG. 4) and the scale M, marked on the ring 208, will be termed the "first" and "second" element of the first indicating pair (for the first factor) of the first slide rule arranged for the first equation.

Under the gear wheel 13 fixed to the element 72, there is disposed a ball bearing race 93. This ball race serves to cause the scale M to remain stopped, by virtue of the mass of its support and owing to the inertia force, in that position with respect to hair line *i*M, in which it was brought by the operator, and to prevent its displacement, when the hollow shaft 73 rotates inside of the hollow shaft 72. This arrangement is sufficient for providing a "locking" of the first element, hair line *i*M, of the first indicating pair and the second element thereof, scale M. Consequently both elements will remain at all times in the relative position, in which they are placed by the operator, until the element 72 carrying the scale M is rotated directly or indirectly in the right-hand or left-hand direction.

The hollow shaft 12 (FIG. 1) is integral with a cup shaped element 209 (second rotatory element), having at its edge a concentrically secured ring 210 of plastic material with a second logarithmic scale marked on the upper face thereof for the factor *r* of the Equation 1', which scale is subdivided in a set of scales.

The factor *r* is the result of a complex algebraical expression $$r = \sqrt{\frac{2}{fckj}}$$

wherein $$k = \frac{n}{n + fs/fc} \text{ and } j = 1 - \frac{k}{3}$$

and depends, therefore, upon the values of *n*, *fc*, *fs* representing the conditions interesting the operator.

The ring 210 carries some scales of the factor *r* marked thereon. Each of said scales is established for a determined value of *n* and *fs* and has a series of logarithmic values corresponding to the value of *r*.

Correspondently to the division lines of the scale instead of the values of *r*, there are marked the respective values of *fc*. The advantage of such an arrangement consists in a large number of scales (seven in the drawing) arranged on the ring 210 and in fact this number is tripled owing to a particular disposition of three hair lines instead of one for reading said scales and also in the facility of superposing other discs with other values, such as one for every value of *n*, for changing indefinitely the conditions *n*, *fs*, *fc*.

The values of *r* decrease with increase of *fc* and therefore, when on the scales *r* (FIG. 6) the values *fc* decrease in the clockwise direction, the values *r* are given on a right-hand scale having values increasing in the clockwise direction. For marking the values *r* a logrithmic scale based on the whole circumference is used.

Therefore, the scale *r* (comprising all the scales of the values *r*) is a single right-hand scale, that is a unit scale (1–10) comprising the whole circumference and having the values increasing in the clockwise direction.

The hollow shaft 12, carrying the scale *r* has fixed thereto at its lower end a gear wheel 7 similar to the gear wheel 13 and meshing therewith.

The scale *r*, assigned to the second factor "*r*" of the first equation, forms the first element of the second indicating pair of the first slide rule.

Owing to the gear wheels 7 and 13, meshed one with the other every left-hand rotation of the second element of the first indicating pair (the scale M) will cause an equal right-hand rotation of the first element of the subsequent indicating pair: the scale *r*.

Rotatably mounted within the hollow shaft 12 (FIG. 1) is a hollow shaft 8 rigidly carrying at the lower end a gear wheel 3, similar to the gear wheels 7 and 13.

The hollow shaft 8 is shaped at its upper portion in the form of a truncated cone 10. A flange 11 (third rotatory element), having a conic bore exactly fitting the truncated cone 10 of the shaft 8, is tightened against the cone 10 by means of a nut 70. In this way it is rigidly connected with the shaft 8 and may be disengaged at will therefrom by suitable outer knobs, as the machine is mounted, for executing the calibrating operation, as will be described hereinafter.

The flange 11 carries a transparent plate 211, secured to it by a set screw 94, superposed on the scale *r* and having a second hair-line *ir* marked thereon with two auxiliary lateral hair lines being provided (FIG. 6), namely a hair line *ir*' marked at the right hand side of the central hair line *ir* and consisting of two close arranged lines and a hair line *ir*'' marked at the left hand side of the central line *ir* and consisting of a dash line. From the above equation of the value *r* it may be noted that by doubling the values *fs* and *fc*, the values of *r* are multiplied by $$\frac{1}{\sqrt{2}}$$

and by halving the values *fc* and *fs* the values of *r* are multiplied by $\sqrt{2}$. Therefore, the lateral hair lines *ir*' and *ir*'' are angularly displaced one from another by an angular gap corresponding to $\sqrt{2}$ on the same logarithmic basis of the underlaying scale, and consequently they indicate on the scale *r* the values divided and multiplied by $\sqrt{2}$ with respect to values indicated by the central hair line *ir* and corresponding to the double values and to the half values of *fs* and *fc*. Therefore, on the transparent plate 211 there are marked near the central hair line *ir*, in correspondence to the various scales of their values (seven in the drawing) some common values of *fs*, f.i. for the countries using the decimal metric system (kilograms and centimeters) such as: 200, 300, 800, 900, 1000, 1400, 2400 (kilograms per sq. centimeter), which values are the same for which the values of r of the seven scales have been calculated. Near the double line $ir'$ in the plate 211 in correspondence of said seven scales double values indicating $fs$ are marked and said line will be used just for said double values of $fs$, the operator taking care to double mentally also the values of $fc$ which will be indicated on the scale. Beside the dash line $ir''$ in correspondence of the same seven scales there are marked values indicating $fs$, representing a half of those corresponding to the central hair line $ir$ and the operator must divide by two also the value $fc$ indicated on the scale.

The seven scales $r$ marked on the ring 210 for seven values of $fs$ may be used for a tripled number of values $fs$. The value of $n$, to which the scales refer, is indicated for the whole ring and for the separate scales.

The transparent plate 211 with the three hair lines $ir$, $ir''$, $ir'$, superposed on the scale, forms the second element of the second indicating pair assigned to the second factor of the first equation.

The hollow shaft 99 (FIG. 2) rotatably mounted in the cylindrical bore 203 of the support 96 carries on its upper end two nuts 68 and 68' preventing a downward displacement thereof and on its lower end a hollow cone 6 rigidly secured thereto. Moreover, the cone 6 carries an outer gear 101 meshing with the gear 7.

The solid shaft 97 carries at its upper end a knob 1 and at its lower end is enlarged to form a cone 5 fitting the hollow cone 6 and pressed against this latter by a spiral spring 4 acting against a disc 212 and a ball race 98. The cone 5 carries a gear 2 meshing with the gear 3.

In the space between the lower face of the knob 1 and the upper face of the nut 68 a braking unit is arranged comprising a collar 62, a foil spring 64 secured to the support 96 and a ring 66 of a suitable material. This braking unit will be operated, as described below, when the operator pushes the knob 1 against the action of the spring 4.

The spring 4 causes the cone 5 to adhere rigidly to the cone 6 and consequently the gears 101 and 2 cause the gears 7 and 3 to rotate together. In this way also in the second indicating pair the first element, the scale $r$ with its support, and the second element, the hair lines $ir$, $ir'$ and $ir''$ will be normally locked together in the relative position into which they were brought by the operator.

The hollow shaft 73 (FIG. 4) at its lower end has fixedly mounted a gear 14, having a diameter equal to that of the gear 3 and meshing therewith (FIG. 1). The upper end of the shaft 73 has mounted thereon a cylindrical cup having a peripheral flange 17. Secured to the inner edge of the flange 17, which is the fourth rotary element, is a concentric ring 219 of plastic material and on the upper face of such ring a third scale $d$ is marked (FIGS. 4 and 6a).

The scale $d$ is a normal single, right-hand logarithmic scale with its values increasing in the clockwise direction and it has a unit scale (1 to 10) comprising the whole circumference. Said scale $d$ forms the first element of the third indicating pair of the first slide rule, assigned to the third factor $d$ of the first equation. By coupling the gears 14 and 3 (FIG. 1) the scale $d$ is caused to perform always a rotary motion like that of the second element of the foregoing indicating pair i.e. the plate carrying the hair line $ir$, but in the opposite direction.

The shaft 23 (FIG. 4) rotatably mounted in the shaft 43, has at its upper end a nut 74 and a transparent plate 213, which is the fifth rotary element, rigidly connected to the shaft 23 by pressure exerted by a nut 86. The nut 86 has at its lower end a cylindrical portion acting as an axis for two further rotary transparent plates 224 and 229.

The transparent plate 213 (FIGS. 6a and 7a) is circular and has on one side an elongated projection carrying the hair line $iP$ comprising four radial hair lines, placed one on the prolongation of another. Each of these four hair lines are superposed on its own scale and form together the unit line $ip$ superposed on four scales of the central dial. The portion of the hair line $ip$, superposed on the scale $d$, termed the "third hair line," forms the second element of the third indicating pair of the first slide rule.

The shaft 23 carries fixed at its lower end a gear 22 similar to the gear 14 (FIG. 4).

The hollow shaft 107 carries at its upper end two nuts 109 and 109' preventing a downward displacement thereof (FIG. 4). The lower end of shaft 107 is shaped in the form of a hollow cone 18 upon which is mounted an outer gear 15 meshing with gear 14.

The shaft 105 carries at its upper end a knob 47 and at its lower end is enlarged to form a cone 20 fitting in the hollow cone 18. The cone 20 is urged against the cone 18 by a spiral spring 19 acting on a disc 214 and a ball bearing race 106. A gear 21, like gear 15, is fixed to cone 20. The unit formed of the above parts, below the knob 47, cause the gears 14 and 22 to rotate together, when the knob 47 is not pressed down, thereby causing the second element of the third indicating pair, the plate carrying the line $ip$, to rotate with the first element, the scale $d$ of the third indicating pair, without changing the relative position into which they have been brought by the operator.

The line $ip$, in the portion superposed on a scale $b$, forms a fourth hair line and the first element of the fourth and last indicating pair of the first slide rule. Since the first element of the fourth indicating pair is marked on the same transparent plate 213 on which is also marked (in prolongation thereof) the second element of the foregoing indicating plate, it assures in a simple way the transmission of the rotation from the second element of the third indicating pair to the first element of the subsequent indicating pair.

The stationary hollow shaft 25 (FIG. 4) has fixed at its upper end a cylindrical cup 27, see FIG. 7a. Inside of the cup 27 a split ring 28 is located which is rendered elastic by a Z-slot and by a series of vertical grooves cut in the inner wall thereof.

At the ends of the split ring 28 two vertical pins 55 are provided which are inserted in two bores 89 of a lever 53 having at its other end a roller 54. In the lateral wall of the cup 27 a slot 81 is provided into which the roller 54 enters. Therefore the ring 28 is free to expand elastically and to remain adherent to the inner cylindrical wall of the cup 27.

Moreover, a metallic ring 30 having an outer diameter equal to the inner diameter of the cup 27 is placed in the cup 27 upon the split ring 28 and is rigidly connected therewith by a pin 79 entering a bore 90 in the split ring 28.

When the split ring 28 adheres to the cup 27 then also the ring 30 is stationary with respect to the stationary cup 27.

Secured to the ring 30 is a plastic ring 215 having on its upper face a fourth scale $b$.

The scale $b$, assigned to the factor $b$ of the first equation, is a normal left-hand logarithmic scale with its values increasing in counterclockwise direction and is double, that is, it has two complete logarithmic scales on its circumference from 1 to 100. The scale $b$ forms the second element of the fourth indicating pair of the first slide rule, the first element of which is formed of a portion of the line $ip$, as above referred to.

The second element of this fourth indicating pair of the first slide rule is rigidly connected to the first element, the hair line $iM$, of the first pair, both being secured to the base 24 and so all the above mentioned indicating pairs form a circular succession of indicating pairs, as shown in the diagram at I in FIG. 8, wherein the four above described indicating pairs are indicated at $a1$, $a2$, $a3$ and $a4$. A rigid connection is provided in cyclic succession between the second element of an indicating pair and the first one of the subsequent pair.

The locking of the first element with the second element of the fourth indicating pair, the plate with the hair line *ip* and the ring with the scale *b*, is attained by the inertia force of the mass of parts connected to the plate 213, such as gear 22, shaft 23. For rendering efficient this locking, the operator must select as a result another factor of the equation, disengaging, in the indicating pair assigned thereto, the locking between the scale and relative hair line, as will be explained hereinafter. In effect, although in the form above referred to of the Equation 1' the factor *b* is separated as second member of the equation and represents the result, this has not any influence on the assembly according to the invention, which is effective for any writing form of the equation with any factor thereof selected as result.

In the succession of the four indicating pairs, *i*M—M, *r*—*ir*, *d*—*ip*, *ip*—*b*, it occurs, as in all known slide rules, that the second element of an indicating pair has its displacement rigidly connected with the displacement of the first element of the subsequent indicating pair, whereas the second element of the last indicating pair is rigidly connected with the first element of the first indicating pair. Therefore, also the above described succession has the property of the known slide rules, consisting in that on the one scale will be added all the displacements indicated on the other scales and in more general terms the mutual displacement of the scale and the hair line will be in any indicating pair always equal to the algebraic sum of the displacements indicated in all the remaining pairs.

Consequently, as will be described in the part regarding the operation of the calculating machine in accordance with this invention, when the scales are arranged in an exact extent and direction, in conformity with the equation to be solved and in a relative position previously adjusted by the operator, it occurs that the values appearing on the scales of each factor always exactly yield the Equation 1'. If from four factors of this equation only one is unknown and all the others are given by the problem, it would be sufficient to set the values of the known factors on the corresponding scales and to read the unknown value appearing on the scale of the relative factor.

Moreover, contrary to known slide rules, a locking of the scale and hair line one with another is provided in each indicating pair, this locking permitting verifying immediately the influence of variation of one factor on the value of another factor, this occurring not only, as in normal slide rules, for two factors pertaining to two contiguous indicating pairs, respectively, but independently from the position thereof in the succession of the indicating pairs. For reading the corresponding variations in the indicating pairs assigned to two factors, even though there are interposed therebetween indicating pairs of other factors, it is necessary to disengage the locking between the scale and hair line in the indicating pair of two factors, the relative variations of which are to be verified; the interposed pairs owing to the locking between the scale and hair line will transfer the displacement of the second element of the indicating pair assigned to the first factor of the selected factors, to the first element of the indicating pair assigned to the second factor maintaining their hair lines locked with the relative scales at the values previously assigned, which are not to be changed. This will appear better hereinafter from the description of the operation.

When, therefore, from four factors of the Equation 1' only two should have values given by the problem and consequently two factors should be unknown, there would exist obviously an infinite solution range of the equation and it might be useful to read quickly a great number thereof. With the device according to the invention, independently of the position of two factors, it will be always possible, after having introduced in the respective scales the values of known factors, to disengage the locking between the scale and hair line of the indicating pairs assigned to two unknown factors and to read in one of said indicating pairs, through the mutual sliding movement of the scale and hair line thereof, an infinite series of values, whereas in the other pair assigned to the other factor simultaneously appears an infinite series of relative values. This serves to understand the subject matter of the invention, although the purpose of this invention is to provide a calculating machine adapted to solve a plurality of interdependent equations.

The second equation of the considered plurality is the following:

$$As = r.t.\frac{M}{d} \qquad (2')$$

which may be rewritten as follows:

$$tMr\frac{1}{d} = As$$

or $$\log t + \log M + \log r - \log d = \log As$$

It is to be noted that in this equation the factors M, r, d appear also as in the Equation 1', but some of them, r, d, with a different exponent. Therefore, the three factors M, r, d are common for both Equations 1' and 2'.

The second slide rule, arranged for said second equation, is not independent of the first one, but branched off therefrom, as shown in the diagram at II in FIG. 8, that is, it comprises those indicating pairs of the first slide rule, which are assigned to the common factors and to which are "coupled," as will be explained hereinafter, indicating pairs assigned to factors *t* and A*s* appearing in the second equation. Said indicating pairs form, together with the common indicating pairs a second different cyclic succession for the second equation.

For this purpose, the displacements of the second element of the last common indicating pair, *a*3, in FIG. 8, will be transferred, besides to the first element of the pair *a*4 of the first slide rule, also to the first element of the pair *b*1, which forms the first pair of the two added indicating pairs.

The cyclic connection will be attained by transferring through mechanical means the displacement of the second element of the last added pair to the first element of the first common indicating pair. This is not clearly visible in FIG. 8, since the pair *a*1 is used in the second slide rule two times, the first one as common and the second one as an added indicating pair, as will be set forth hereinafter.

Referring now to the second slide rule, the common indicating pairs *i*M—M, *r*—*ir* and *d*—*ip* have been already described with reference to the first slide rule and form respectively the first, second and third indicating pairs of said second slide rule.

The first added indicating pair of the second slide rule is assigned to the factor A*s* and the first element thereof is the same hair line *ip* superposed on a scale A*s*, which portion thereof forms a fifth hair line (FIG. 6*a*). Therefore, the plate 213 transmits the displacement of the second element of the third indicating pair (the third hair line) not only to the fourth hair line (that is the first element of the fourth indicating pair of the first slide rule), but also to the fifth hair line forming the first element of the first added indicating pair for the second slide rule (the portion of the line *ip* superposed on the scale A*s*); said first added indicating pair assigned to the factor A*s* forming the fourth indicating pair of the second slide rule.

The second element of said indicating pair is the scale A*s*, forming a fifth scale of the machine (FIG. 6*a*), marked on a ring 231 (sixth rotary element) of plastic material (FIG. 4) secured to a flange 45 fixed to the upper end of hollow shaft 43.

The hollow shaft 43 has fixed at its lower end a gear 42 similar to gears 14 and 13. The scale A$s$ is a usual single left-hand logarithmic with a scale 1 to 10 extending on the whole circumference, the values of which increase in counterclockwise direction.

The locking between the hair line and the scale is assured in this indicating pair by the inertia of the masses of parts connected with said hair line and scale, but this will be of interest for the fourth slide rule, of which also this indicating pair is a part, whereas in the second slide rule the locking is not necessary, since in the pertaining equation the factor assigned to said indicating pair is as a matter of fact at all times a variable and never a constant valve.

The hollow shaft 38 (FIG. 1$a$) rotatably mounted on the fixed solid shaft 39 carries at the lower end thereof a flange connected to a gear 37 like the gear 42 and meshed therewith.

Consequently, the gear 42 will rotate in clockwise direction through the same angle which the gear 37 will rotate in counterclockwise direction. The shaft 38 is tapered at its upper end in the form of truncated cone 40.

A part 41 having a tapered bore fitting the cone 40 is held pressed thereagainst by a nut 71 and is thus rigidly connected with the shaft 38. By unscrewing the nut 71, this rigid connection may be interrupted for the calibration operation, when the machine is assembled.

Figure 6A:
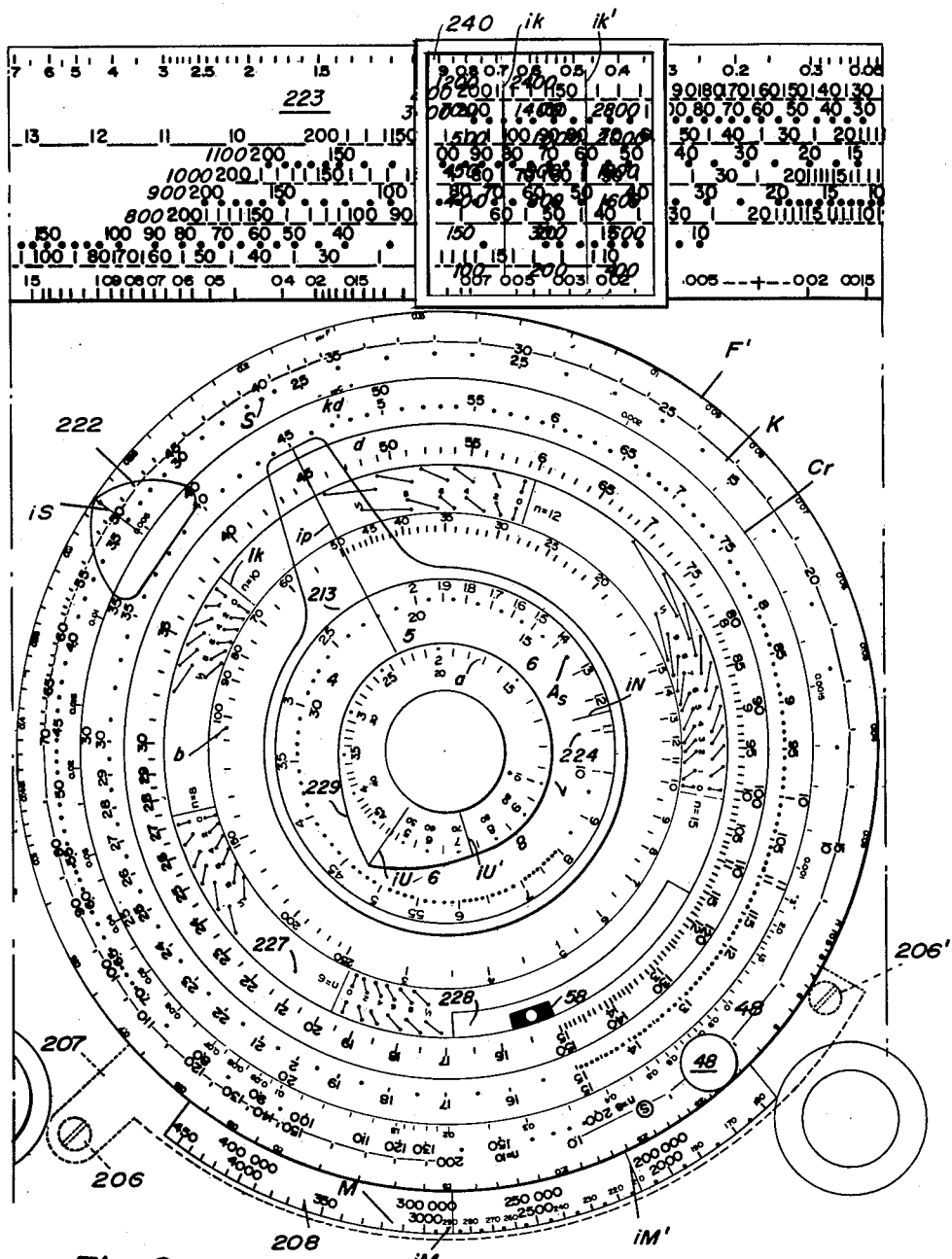

To a flange upon the part 41 there is secured by means of a set screw 103 a transparent plate 216 forming the seventh rotary element and carrying a sixth radial hair line $it$ with two other radial auxiliary hair lines $it'$ and $it''$ being marked thereon (FIG. 6$b$). Likewise as set forth with reference to the hair lines $ir$, $ir'$, $ir''$ of the plate 211 and for the same reason, these three hair lines $it$, $it'$ and $it''$ are also offset by the angle $\sqrt{2}$ (in the same logarithmical base of the underlaying scale) and near the central single line there are marked the values $fs$, for which seven scales of $t$ values have been calculated, as set forth hereinafter. Near the double line $it'$ the double values and near the dash line $it''$ the half values of $fs$ are marked.

In this case, the relative position of the three lines $it$, $it'$ and $it''$ is reversed, that is the double line $it'$ is marked at the left-hand and the dash line $it''$ on the right hand with respect to the central line $it$.

This is due to the fact that the values $t$ decrease and the values $r$ increase in a clockwise direction.

The plate 216 having the lines $it$ forms the first element of the second added pair corresponding to the fifth indicating pair of the second slide rule. The plate 216 is rigidly connected with the second element (scale A$s$) of the foregoing indicating pair by means of a gear 37 meshing with the gear 42 and in consequence it will rotate in counterclockwise direction by the same clockwise rotation angle of the scale A$s$.

The hollow shaft 33 (FIGS. 1$a$, 3) is rigidly connected at the lower end thereof to a gear 32, like the gear 37. At its upper end the shaft 33 is cup-shaped as shown at 217. To a flange upon part 217 a plastic ring 218 is concentrically secured, which forms the eighth rotary element and carries on its upper face a sixth scale for the $t$ factor of the Equation 2' and is divided into a series of scales.

Also the $t$ factor, as the $r$ factor, is the result of a complex equation depending upon $n$, $fs$, $fc$:

$$t = \frac{fc}{2fs}\sqrt{\frac{6n}{3fs+2nfc}}$$

and for this reason the marking of the $t$ values of said scales will be similar (excepting the extent of the resulting spaces) to the marking of the above $r$ scales and therefore also in the $t$ scales, each pertaining to a value of $n$ and to a value of $fs$, on the edges of circular segments having a $t$ extent, there is marked a succession of the $fc$ values, for which the $t$ values have been calculated, but contrary to the $r$ values, the $t$ values increase with increasing of the $fc$ values and in consequence, when on the $t$ scale, likewise as for the $r$ scales, there are marked the $fc$ values increasing in a counterclockwise direction, also the $t$ scale has values increasing in a counterclockwise direction. The scale $t$ is a single scale (1 to 10) extending on the entire circumference and forming the second element of the fifth indicating pair (for the $t$ factor) of the second slide rule.

The hollow shaft 114 (FIG. 3), rotatably mounted in the cylindrical bore 204 of the support 111, carries at its upper end two nuts 69 and 69', preventing its displacement downwards and has its lower end shaped in the form of a hollow cone 34. The cone 34 carries an outer gear 116 meshing with gear 32.

The shaft 112 carries at the upper end thereof a knob 46, whereas its lower end is shaped in the form of a cone 78 fitting in hollow cone 34 and urged thereagainst by means of a spiral spring 35 acting against a disc 219 and a ball bearing race 113. The cone 78 carries rigidly a gear 36 like the gear 116 and meshing with the gear 37. Between the lower face of the knob 46 and the upper face of the nut 69 there are a collar 63, a flat spring 65 fixed to the support 111 and a plastic ring 67, which form a braking unit similar to that at the knob 1 and having the same purpose, as set forth below. Also in this case the cones 34 and 78 serve to cause the gears 32 and 37 to rotate together, when the knob 46 is not pressed down. In this way, in the second added indicating pair (fifth indicating pair) of the second slide rule, the hair line $it$ and the scale $t$ will rotate together, maintaining the position, into which they were brought by the operator, by pressing down and turning the knob 46, since their supports are locked one with another.

For closing the cyclic connection, the second element, the scale $t$, of this pair should be rigidly connected to the first element, the plate having the line $i$M marked thereon, of the first indicating pair of the set $a$1, $a$2, $a$3 in FIG. 8 common to the first and second slide rules. In effect, the gear 32 rigid with the support of the scale $t$ meshes through an idle sprocket wheel 31 (FIGS. 1$a$, 5) with the gear 13 rigidly connected to the support of the scale M. Therefore, the gear 32 and the scale $t$ will rotate in counterclockwise direction when the support of the scale M rotates in counterclockwise direction.

Consequently, between the scale $t$ (second element of the fifth indicating pair) and the hair line $i$M (first element of the first indicating pair) a further indicating pair is interposed, which pair is formed of the scale M and the hair line $i$M. Therefore, this indicating pair will be effective not only as the first common indicating pair but also as a sixth indicating pair of the second slide rule.

The second element of this sixth indicating pair (the plate with the hair line $i$M) is rigidly connected with the first element of the first common pair (the same plate with the hair line $i$M), in the circular succession of the indicating pairs of the second slide rule.

The doubling of the displacement between the scale M and the hair line $i$M for the second slide rule is obtained by means of mechanical connections and will be now set forth, without taking into account the circulatory direction of the succession of the indicating pair of the second slide rule, but starting from the stationary point thereof (the plate carrying the hair line $i$M) and following the transmission in both directions to the indicating pair of the factor A$s$.

As set forth and as will be noted with greater detail in the operation, the rotary movement imparted by the operator to the scale M will be transferred in the same amount and direction to the hair line $ip$ through the connections of the supports of the scale M, scale $r$, hair line $ir$, scale $d$ and hair line $ip$. Simultaneously, the same movement will be transferred a second time through the connections of the gear 13, sprocket wheel 31, the gear 32 (FIG. 1$a$), cones 34 and 78 (FIG. 3), gear 37, gear 42 also in the same amount, but in opposite direction to the scale $As$ and consequently its effect will be doubled in the indicating pair $ip—As$. This redoubling is necessary since, taking into account the fact that the base of the scale $As$ is an entire circumference, whereas the base of the scale $M$ is a half circumference, the rotation of the hair line $ip$ upon the scale $As$ in an amount corresponding to the rotation of the scale $M$, would assure a halving effect, as will be explained hereinafter in the operation.

In effect, these connections are based on the Equation 2' written in the following form:

$$\log t + \tfrac{1}{2} \log M + \tfrac{1}{2} \log M + \log r - \log d = \log As$$

A third slide rule provided for the third equation is very simple, since it serves for solving a simple equation which may be written as follows:

$$kd = kd \qquad (3')$$

or also:

$$\log k + \log d = \log kd$$

This equation has in common with the Equation (1') the factor $d$ and consequently said third slide rule will be branched off on the first slide rule and will comprise the indicating pair assigned to the factor $d$, as shown at III in FIG. 8.

The parts forming the indicating pair assigned to the factor $d$ in the first slide rule and the connections locking the first element (the scale $d$) with the second element (the hair line $ip$) of said indicating pair by means of cones 18 and 20 shown in FIG. 4, have been already described.

The second element, the hair line $ip$, of said indicating pair of said slide rule forms, in its outermost prolongation superposed upon a scale $k$, the seventh hair line corresponding to the first element of the second indicating pair of the third slide rule.

A ring 50 (FIGS. 1, 1a, 4) is slidably mounted in a groove of the flange 17 fixed to shaft 73 beyond the ring 219 with the scale $d$ which is secured to the inner edge of the flange 17.

On the outer vertical wall of the ring 50 teeth are provided which mesh with a sprocket wheel 49 controlled by a knob 48 and supported by the flange 17. Secured to ring 50 is a plastic ring 220, on the upper face of which is marked a scale $kd$, the seventh scale. The scale $kd$ is a usual right hand single logarithmic scale, as the scale $d$, and forms second element of the indicating pair assigned to the factor $kd$, corresponding to the seventh indicating pair of the machine.

The scale and hair line of said indicating pair are not locked with one another, since the corresponding factor is never a constant value but is always an unknown or variable value.

The ring 50 carries a transparent plate 222 (FIG. 1a, 4, 6a) secured by a set screw 221 thereto, on which plate an eighth radial hair line $iS$ is marked which forms the first element of the subsequent indicating pair assigned to the factor $k$, corresponding to the third indicating pair of the third slide rule.

Therefore, the rigid displacement of this first element with the second element of the foregoing indicating pair is assured in a simple way.

The second element of the third indicating pair, assigned to the factor $k$, is an eighth scale $k$, marked on a plastic ring S secured to the outer edge of the flange 17 (FIGS. 1, 1a, 4, 6a). Scale $k$ is secured to the same flange 17, to which is secured also the scale $d$ forming the first element of the first indicating pair of the third slide rule, thus establishing the cyclic succession of the three indicating pairs forming the third slide rule.

In such third indicating pair the locking between the first element (the plate with the hair line $iS$ rigid with the ring 50), and the second element (the scale $k$ rigidly connected to the flange 17) is assured by the friction between the teeth of the ring 50 and the teeth of the sprocket wheel 49 (FIG. 1), which friction is increased by springs 51 (FIG. 1a) controlled by means of screws 52.

The factor $k$ of scale $k$ is the result of a complex equation $$k = \frac{n}{n + fs/fc}$$

depending upon $n$, $fs$, $fc$ and in consequence, the scales $k$ of the ring S (two in FIG. 6a) are marked, as the scales $r$ and $t$, for a given value of $n$ and $fs$ and have instead of the $k$ values a succession of the $fc$ values, for which the $k$ values have been calculated.

According to the above equation, the $k$ value increases with the increasing of the $fc$ values. In FIG. 6a the $fc$ values increase in counterclockwise direction and in consequence the scale of $k$ values is a simple left-hand logarithmic scale (the entire circumference comprises a unit scale 1 to 10).

The width of the ring S does not allow to provide for $k$ the same number of scales provided for the factors $r$ and $t$. On the other hand, it is necessary to place the factors $r$, $t$ and $k$ at values corresponding to like conditions of $n$, $fs$, $fc$ imposed by the problem or by the operator.

Since the equation of $k$ is more simple than the equations of $r$ and $t$, it allows an entire range of $n$, $fs$, $fc$ values with a lesser number of scales.

From the equation of $k$, above referred to, it results that when $fc$ is divided by the same values, by which $n$ was multiplied, the value of $k$ does not change.

Thus, the scale $k$ for $n=10$ may be used for $n=8$ dividing by 0.8 the $fc$ values read thereon.

Moreover, from the above equation of $k$ it results that the value of $k$ does not change for all the values of $fc$ and $fs$ having the same ratio. For this reason it is easy to extend to other $fs$ values the use of two scales of values of the ring S, which may be provided, as shown in FIG. 6a, for a unit value of $fs$ (1400) and for two different values of $n$ (10 and 8).

Figure 6B:
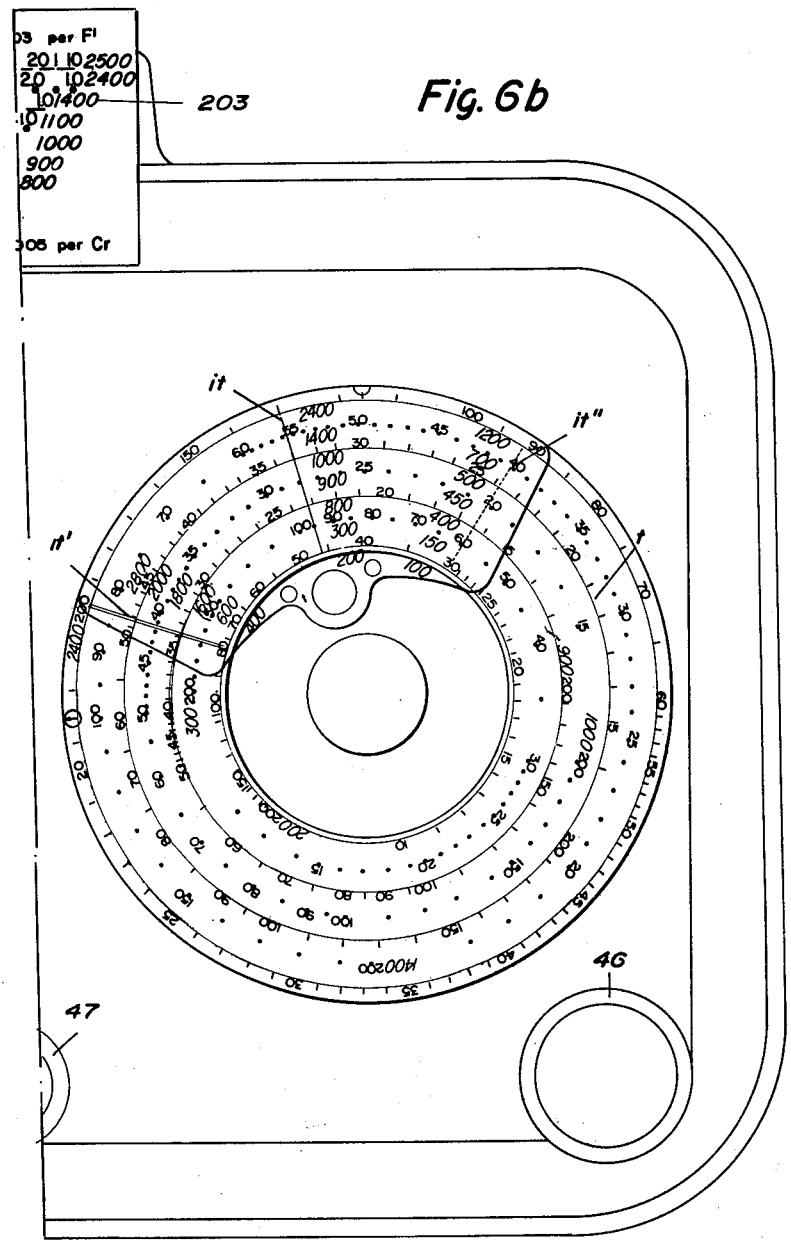

Therefore, along the upper edge of the casing 230, a table 223 is provided (FIGS. 6, 6a, 6b), on which a transparent slider 240 is movable which has two hair lines $ik$ and $ik'$ marked thereon and near said lines are marked the $fs$ values of underlying scales and double and half values thereof. In the table 223 a large number of scales are marked, each for one $fs$ value and each having a succession of $fc$ values, said scales being placed with respect to each other so that on the same vertical line there are $fc$ values in the same ratio with $fs$ values of the corresponding scale. Obviously, on the same vertical line of the desired $fc$ value, taken on the desired $fs$ value scale, there is marked the value of $fc$ to be used in the scale $k$ of the ring S, that is, the one having with the corresponding $fs$ value the same ratio of the two desired $fc$ and $fs$ values.

The upper and lower edges of table 223 are used for two scales $F'$ and $Cr$, giving two parameters depending upon the ratio $fc/fs$, as will be set forth hereinafter. The same scales $F'$ and $Cr$ are arranged on the outer and inner edges of the ring S.

The three indicating pairs, above referred to for the third slide rule, give in the usual way the products of the factors assigned thereto, as set forth in detail below.

The indicating pairs have also the property of allowing the introduction of the $k$ factor independently of the factor $d$ and assuring the reading of the corresponding $kd$ in the instant in which the factor $d$ assumes any value in the other equations.

The fourth equation of the considered plurality may be written as follows:

$$N = \frac{3}{4/5\,Av} As \qquad (5''')$$

or:

$$\log N = \log \frac{3}{4/5} - \log Av + \log As$$

In this last equation the first term of the second member $$\left(\log \frac{3}{4/5}\right)$$

is a constant factor, for which it is not necessary to provide an indicating pair, but only a suitable initial mutual displacement of the scales of the other factors.

The factor $As$ is common also to the Equation 2', and consequently the fourth slide rule is branched off on the second one, which in turn is branched off on the first slide rule, as shown at IV in FIG. 8. Therefore, the fourth slide rule comprises the indicating pair of the second slide rule, assigned to the factor $As$ (line $ip$—scale $As$) and has two further indicating pairs ($d1$ and $d2$ in FIG. 8) for the factors N, $Av$.

The fifth scale $As$, second element of the fourth indicating pair of the second slide rule, operates as the ninth scale and forms the first element of the first added indicating pair (second indicating pair of the fourth slide rule), thus being assured a rigid displacement of both elements, since they form a unit scale.

Upon the transparent plate 213 (FIGS. 6a, 4, 7a) a second transparent plate 224 is provided, on which a ninth radial hair line $i$N is marked. The plate 224 is rotatable around the nut 86, screwed on a bolt axially projecting from the shaft 23. The line $i$N forms the second element of the first added indicating pair (second indicating pair of the fourth slide rule) for the factor N.

The tenth indicating pair of the machine is formed by the same radial hair line $i$N, which in its innermost portion forms the tenth hair line and first element of the second added indicating pair (third indicating pair of the fourth slide rule) for the factor $$\frac{3}{4/5 \; Av}$$

The second element of this tenth indicating pair is a scale having few numbers, as shown by 226 in FIGS. 6a, 7, marked on the circular portion of the transparent plate 213 placed under the plate 214 carrying the hair line $i$N.

The numbers (4, 5, 6 . . . ) of said scale indicate the diameter (in millimeters) of the steel rod used for the stirrups, and are placed at the ends of a circular sector corresponding (in the same logarithmic basis of the scale $As$) to the value giving the area $Av$ of both branches of a stirrup formed by steel rods with a diameter of 4, 5, 6 . . . millimeters, all said values being multiplied by the constant coefficient $$\frac{3}{4/5}$$

of the fourth equation.

The scale of numbers 226 marked on the plate 213 forms the second element of the third indicating pair for the factor $Av$ and thus it is rigid with the first element (the hair line $ip$) of the first indicating pair of the fourth slide rule, assigned to the factor $As$ marked on the same plate 213, thus attaining the cyclic continuity of the connection of the second element of this last indicating pair with the first element of the subsequent indicating pair forming the first one (that common to this fourth slide rule and to the second slide rule), on which the fourth slide rule is branched off.

A screw cap 225 (FIG. 4) keeps the plate 224 pressed against the plate 213. In this way the plate 224 may be rotated by the operator by means of a point, with respect to the plate 213, which will remain stopped owing to its inertia, but it is normally locked therewith through the friction, thus obtaining the desired locking of the first element with the second element of the third indicating pair of the fourth slide rule.

A further indicating pair will now be described which is arranged so as to be insertable at will by the operator in some slide rules for the modification of some equation of said plurality or for using the machine for other pluralities of equations, having a certain affinity with the above considered plurality.

In the diagram at I of FIG. 8 there is indicated at I' a fifth indicating pair of the first slide rule. This will be useful for the operator, when he desires to know the variation of some factors, owing to the introduction in the compressed zone of the beam section, of variable area steel, expressed in ratio to the area steel $As$ of the stretched zone.

In this case the Equation 1' will be:

$$ub = r^2 M \frac{1}{d^2}$$

in which the factor $u$ is the result of a following complex form $$u = \frac{fs}{fs - 2/3ncfc}$$

according to which its value depends upon $n$, $fs$, $fc$ and $c$, the latter factor indicating the ratio between the compressive area steel and the tensile area steel (0.2–0.4–0.6 and so on).

Therefore, means are provided, by which the operator may disengage the coupling between the scale $b$ (second element of the last indicating pair of the first slide rule) and the hair line $i$M (first element of the first indicating pair), which are both fixed, as above referred to, to the frame owing to the adherence of the elastic ring 28 (FIG. 7a) to the cup 27 secured to the frame.

The ring 215, on which the scale $b$ is marked, carries rigidly a $k$ plastic transparent ring 232 having an eleventh radial hair line $i$K. In effect, said hair line $i$K consists of five hair lines (FIGS. 6a and 7a), one for each value of the $n$ factor, indicating on an eleventh logarithmic scale, also consisting of five scales of the $n$ factor (one for each value of the $n$ factor) and marked on the ring 227, concentrically secured to the edge of the stationary cup 27. The hair lines $i$K, rigid with the scale $b$, form the first element of the eleventh indicating pair of the machine, corresponding to fifth indicating pair of the first slide rule for the $u$ factor. The scales $u$ of the ring 227, rigidly connected to the frame and to the plate carrying the hair line $i$M form the second element of said fifth indicating pair of the first slide rule. Above said first and second element (lines $i$K and scales $u$) are normally locked one with another by adherence, above referred to, of the ring 28 to the cup 27.

The scales $u$ extend only on a little portion of the circumference. Therefore, on the circumference there is provided a great number for amplifying the conditions of $n$, $fc$, $fs$ related to the $u$ factor.

In FIG. 6a are shown five scales for five $n$ values, each having its own hair line $i$K on the ring 232. Each of said five scales consists of four circumferences of points (connected two by two for facilitating the interpolation) and assigned to values 0.2, 4.6 . . . which correspond to 0, 0.2, 0.4, 0.6 . . . representing the value of the $c$ factor of the equation of $u$.

In each of this four series of points, the points are placed at the ends of spaces corresponding (in the same logarithmic scale of $b$) to the values of the $u$ factor, calculated for the indicated value of the $c$ factor and the values of $n$, $fs$, $fc$ marked at each scale.

Outwardly of the cup 27 a ring 57 is rotatably mounted (FIG. 7a), having a projection 58, the end of which is visible in FIG. 6a since it extends through a slot 228 of the ring 227 to the upper face of the scales. In this way, the projection 58 is controllable by the operator by means of a point, without preventing a complete turn of the plate 213.

A sliding shoe 80 and a pin 60 are provided on the inner wall of ring 57. The shoe and pin pass through the slot 81 provided in the cup 27, the shoe 80 being flush with the inner vertical wall of the cup 27, whereas the pin 60 projects to the inner wall of the ring 28, passing through a slot 83 in ring 28.

Rotatably mounted within the ring 28 is a ring 29 having on its upper edge four projections 91 projecting vertically and engaging four notches 92 provided in the plate 213, whereby the plate 213 is rigidly connected with the ring 29.

For inserting this fifth indicating pair of the first slide rule, the operator displaces slightly in clockwise direction the projection 58, thus causing the ring 57 to rotate in clockwise direction. Therefore, the pin 60 contacts the right hand wall (FIG. 7a) of the slot 83, whereas the sliding shoe 80 pushes inwardly the roller 54 in the slot 81, thus displacing the lever 53, which by means of the two pins 55 inserted in the bores 89 cause the ring 28 to contract around the ring 29, locking the hair line $ip$ with the scale $b$, at the same instant in which the scale $b$ will be disengaged from the stationary frame. When the operator presses now the knob 47 (FIG. 4), thus disengaging the hair line $ip$ from the scale $d$ (of the indicating pair $a3$ of FIG. 8) and rotates in clockwise direction the knob 47, the plate 213 will rotate in counterclockwise direction together with the scale $b$ and the plate 232 having the hair line $iK$ is superposed upon the scales $u$.

Therefore, while the hair line $ip$ will indicate on the scale $d$ decreasing values, the operator will be able to read the corresponding variations of values of the $d$ and $u$ factors.

For the $u$ factor he does not read its values, but the new conditions of the ratio $c$ of the compressive area steel to the tensile area steel, which are necessary to obtain this factor. When the hair lines $iK$, rigid with the scale $b$, in turn rigid with the hair line $ip$, rotate in counterclockwise direction, have given the desired $c$ ratio, it is necessary to bring the assembly quickly to the original position of $c=0$, in which all the five hair lines $iK$ coincide with the zero value of the corresponding scale, and to disengage the locking between the scale $b$ and the plate 213 carrying the hair line $ip$, when the hair lines $iK$ are brought back in the original position together with the scales $b$, the scale $b$ being then locked with the frame (and thus with the plate carrying the hair line $iM$), whereby the provisionally inserted indicating pair $a5$ will be disconnected.

This will be obtained as follows:

In a vertical bore 84 provided in the lower horizontal wall of the slot 83 of the ring 28 there is placed a ball 61, as shown in FIG. 1. In the original position of the ring 28 (hair line $iK$ upon the zero value of the scale $u$) said ball 61 does not project from the lower wall of the slot 83 owing to a recess provided in the bottom of the cup 27, said recess allowing the ball 61 to project slightly from the lower wall of the ring 28. Thus, when the operator desires to insert the fifth indicating pair of the first slide rule, he rotates in clockwise direction the projection 58 and the ball 61 does not prevent the pin 60 to pass over the bore 84 and to adhere to the right hand wall (in FIG. 7a) of the slot 83.

When the operator by pressing down and rotating in clockwise direction the knob 47, rotates in counterclockwise direction the plate 213 together with the ring 28 (with the scale $b$ and the plate carrying the hair lines $iK$) to read a series of values on the scale $u$, the right hand wall of the slot 83 pushes the pin 60 and causes the ring 57 to follow the left-hand rotation of the ring 28. Therefore, during this rotation the sliding shoe 80 will press the roller 54, maintaining said rigid connection of the parts 57, 28, 215, 29, 213. As soon as this movement begins, the ball 61 goes out from its recess 82 and, while sliding on the bottom of the cup 27, projects slightly out of the bore 84 into the slot 83.

When the operator has finished the reading of the variations on the scale $d$ and on the scales $u$ and begins the inverse movement by pressing down and rotating the knob 47, causing thus the right-hand rotation of the plate 213 still connected with the ring 28, the ball 61, projecting within the slot 83, will push the pin 60 causing the ring 57 to rotate in clockwise direction. Thus, also the back movement in clockwise direction takes place while all the parts 57, 28, 215, 29 and 213 are held rigidly connected one with another, to the starting position.

At this instant (zero position of the hair lines $iK$) the ball 61 will enter the recess 82, disengaging the pin 60 from the ring 57, which will be capable of rotating slightly in counterclockwise direction by a pressure exerted by the roller 54 on the right hand edge (in FIG. 7a) of the sliding shoe 80. This movement will disengage the roller 54 from the sliding shoe 80, allowing thus the roller 54 to enter the slot 81. In this way the slit ring 28 may be able to repeat its expansion so as to adhere rigidly to the cup 27. Thus, the first slide rule will again consist only of the original four indicating pairs.

Also the fourth equation may have the following different form:

$$N = \frac{3}{4/5 Av} As \qquad (5''')$$

if the conditions of the fixed end of the beam are different from those previously assumed or if a value different from 4/5 of the Equation 5''' will be used for the ratio of the shear resistance of the steel used for stirrups ($fv$) to the tensile resistance of the stressed steel ($fs$). For taking in account these modifications, in the Equation 5''' there should be inserted a new variable factor, which will be termed K, so as to modify the constant coefficient $$\frac{3}{4/5}$$

already comprised in the equation. Should, for example, the conditions of the fixed ends of the beam be such as to render necessary the calculation of the bending moment not from the form $$M = \frac{PL}{12}$$

(wherein the load P is uniformly distributed on the entire beam and L is the span of the beam) but from the form $$M = \frac{PL}{8}$$

then in the Equation 5''' there would be introduced a factor $K = 8/12$. Moreover, should the condition $fv = 4/5$ $fs$ be changed to $fv = fs$, in the Equation 5''' there will be introduced a factor $K = 4/5 = 0.8$ and by taking in account both variations, a factor $$K = \frac{8 \times 0.8}{12} = \frac{6.4}{12}$$

will be introduced. Those skilled in the art will be able to select the value of K for all the other possible combinations of the conditions of the fixed beam ends and of the ratio of $fv$ to $fs$.

Therefore, the Equation 5''' may be extended as follows:

$$N = K \frac{5}{4/5 Av} As$$

or $$\log N = \log K + \log \frac{3}{4/5} - \log Av + \log As$$

This equation will be introduced in the calculating machine substituting the indicating pair $d1$ of the fourth slide rule for the factor N with two indicating pairs $d1a$ and $d1b$, respectively for the factors N and K as shown at V in FIG. 8. In this case, the fourth slide rule will consist of the indicating pair $b1$ of the second slide rule, for the factor $As$ and of the added indicating pairs $d1a$, $d1b$, $d2$, as set forth hereinafter.

The scale $As$ (ninth scale of the calculating machine), corresponding to second element of the indicating pair $b1$ of the second slide rule for the factor $As$, operates also in said modification as first element of the twelfth indicating pair corresponding to the first added indicating pair ($d1a$) for the factor N and to the second indicating pair of the slide rule V. The second element does not consist now of the hair line $iN$, but of the twelfth hair line $iU$ marked on a transparent plate 229 (FIGS. 4, 6a, 7a), also rotatable around the nut 86 and placed upon the plate 224. Marked near to the hair line $iU$ on the same plate 229 is a second hair line $iU'$, which is angularly displaced with respect to the line $iU$ so that when the line $iU$ indicates on the underlying scale $a$ the value 10, said hair line $iU'$ indicates the value 12. Since in the K factor may be present this divisor 12, the operator will use as the thirteenth hair line (first element of the subsequent indicating pair) the hair lines $iU$ or $iU'$, according as to whether in the K factor there is comprised or not the divisor 12. In both cases, the second element of the first added indicating pair ($d1a$, second indicating pair of the fourth slide rule) is rigidly connected with the first element of the subsequent indicating pair, and the first element of the second added indicating ($d1b$), corresponding to the third indicating pair of the slide rule V, will be thus, at will, the hair lines $iU$ or $iU'$ of the plate 229.

The second element of the thirteenth indicating pair (third indicating pair of the fourth slide rule V) consists of a thirteenth scale $a$ (FIGS. 4, 6a) marked on a plastic ring 231 rigidly connected by means of nails 76 (FIG. 4) to the transparent plate 224, the scale $a$ is a small normal single left-hand logarithmic scale, as the scale $As$.

The locking of the plate 229 carrying the hair line $iU$ with the plate 224 rigidly connected with the scale $a$ is assured by the pressure of the cap 225 (FIG. 4) assuring also the locking of the plate 224 with the plate 213, carrying the two elements of the subsequent indicating pair ($d2$), which is now the fourth indicating pair of the slide rule V.

The nature and the size of the contact areas of the plates 229, 224, 213 (forming the two indicating pairs of said rule) are controlled so that the same pressure of the cap 225 causes between the plates 229 and 224 a friction higher than the inertia force of the mass of the plate 229, thus assuring the locking of the two plates one with another as the operator rotates the plate 224. This friction is adjusted so as to be lower than the friction occurring between the plates 224 and 213. In this way, when the operator rotates the plate 229, the plate 224 remains locked with the plate 213.

The connection of the second element (the scale $a$) of the third indicating pair ($d1b$) with the first element (the hair line $iN$) of the fourth indicating pair ($d2$ for the factor $Av$) is obvious, since the scale $a$ is rigidly connected, as above referred to, by means of the nails 76 with the plate 224 having the hair line $iN$. The operation of the fourth slide rule will be set forth in detail below.

In another cast the indicating pairs $d1a$ and $d1b$ may form together with the indicating pair $d1$ a fifth sliding rule branched off on the fourth slide rule.

By assigning said indicating pairs in part to factors different from the factors above referred to, said two slide rules may be used in cooperation with the first and second slide rules in which some indicating pairs will be also assigned to factors different from those originally used, for solving a different plurality of equations, similar to the plurality up to now considered, but serving for completely different results. The first plurality of equations serves, as set forth hereinafter, for calculating the section sizes of a beam subjected to a bending moment and of tensile and webb reinforcements thereof. After having calculated the sizes and the reinforcements of a section, termed hereinafter as "primitive" section, it may be of interest to know the area steel $As'$ which should be placed in the compressed zone of the section for reducing the original width $b$ by variable amounts $b°$ (without changing the depth $d$), and simultaneously the reduction $Cr$ to be effected on the area of tensile reinforcements $As$.

The value of $As'$ to be calculated is proportional to an area steel $A°$, according to the following form:

$$As' = \frac{1}{F'}A° \qquad (7')$$

It seems not to be necessary to report a long form of the application in accordance with which the value of F' depends upon the values of $$n, \frac{fc}{fs}, \frac{d'}{d}$$

$d'$ representing the distance between the edge of the section and the point at which there will be placed the steel bars forming the compressive reinforcement.

A scale $F'$, provided at the upper edge of the table 223 (FIGS. 6, 6a, 6b) and also at the outer edge of the ring S, gives the value of $F'$ in dependence upon various possible conditions of $$n, \frac{fc}{fs}, \frac{d'}{d}$$

The factor $A°$ represents the tensile reinforcement related to a portion of the primitive section, for the same values of $n$, $fs$, $fc$ (upon which depend $r$, $t$, $k$) but with a width reduced to a portion $b°$ of the original width $b$ and carrying a portion $M°$ of the original bending moment $M$. The factors $A°$, $b°$, $M°$ are bound one with another and with the other constant factors $r$, $t$, $k$, $d$ by the Equations 1' and 2' of the first considered plurality.

The reduction $Cr$ of the tensile reinforcement in correspondence to the value $As'$ is given by the following equation $$Cr = As'Q \qquad (8')$$

in which also the parameter Q is dependent upon the same values of $$n, \frac{fc}{fs}, \frac{d'}{d}$$

in accordance with a complex equation of the application.

The value of Q is given, in accordance with various possible values of $$n, \frac{fc}{fs}, \frac{d'}{d}$$

by a scale $Cr$, marked on the lower edge of the table 223 in FIGS. 6, 6a; 6b and on the inner edge of the ring S.

For solving this problem a following second different plurality will be used:

$$b° = r^2 M° \frac{1}{d^2} \qquad (1')$$

$$A° = rtM° \frac{1}{d} \qquad (2')$$

$$As' = \frac{1}{F'}A° \qquad (7')$$

$$Cr = As'Q \qquad (8')$$

in which it is interesting to know all the corresponding variations of the factors $$b° \quad M° \quad A° \quad As' \quad Cr$$

and particularly of $b°$, $As'$, $Cr$, the other two factors having a lesser importance.

From the following description of the operation there will clearly appear the manner of using this second plurality for solving a different problem with the same calculating machine, in which the fourth slide rule will be substituted with two slide rules IV and V, and the factors assigned to some indicating pairs (see FIG. 8) are changed as follows:

In the slide rule I the indicating pair $a1$ is assigned to the factor M° instead of M;

In the slide rule I the indicating pair $a4$ is assigned to the factor $b°$ instead of $b$;

In the slide rule II the indicating pair $b1$ is assigned to the factor A° instead of A$s$;

In the slide rule IV the indicating pair $d1$ is assigned to the factor A$s'$ instead of N;

In the slide rule IV the indicating pair $d2$ is assigned to the factor F' instead of A$v$;

In the slide rule V, while maintaining the assignment of the indicating pair $d1$ to the new factor A$s'$, the indicating pair $d1b$ is assigned to the factor Q instead of the factor K and the indicating pair $d1a$ to the factor C$r$ instead of the factor N.

*Operation*

Consider first the first plurality of equations, without the above mentioned modifications, in which:

The Equation 1' has 4 factors
    The Equation 2' has 5 factors
    The Equation 3' has 3 factors
    The Equation 5''' has 3 factors
         Total_____15 factors For these 15 factors the calculating machine as above described has 10 indicating pairs assigned to the following 10 different factors:

M, $r$, $d$, $b$, $t$, A$s$, $k$, $kd$, N, A$v$ because the indicating pairs assigned to the factors: M, $r$, $d$, A$s$ serve contemporaneously for all the slide rules of the machine, which are established for all the equations of the plurality containing said factors.

Means assuring the rigid transmission of the movements of the second element of an indicating pair and the first element of the subsequent indicating pair from one to another, which transmission being usual for all known slide rules, have been already described.

To said known transmission means are added means assuring a permanent locking of the scale with the hair line of all the indicating pairs, or, in some slide rules, of all the indicating pairs, excepting one of them. By said locking means the variation carried out in any indicating pair causes immediately the variation in the indicating pair assigned to the factor selected as result, disengaging also in this last indicating pair the locking of the scale with the hair line (the indicating pair to be selected as result depends upon the manner of writing the equation).

The variations caused by the operator in an indicating pair common to a plurality of slide rules (assigned to a factor common to a plurality of equations) will be transmitted obviously, at the same time to the indicating pairs assigned to factors selected as results, this occurring in all the slide rules having in common said indicating pairs (in all the equations having in common the relative factor).

When one or more indicating pairs are subjected, owing to the variation caused by the operator in other factors, to a variation of the results indicated and are common to other slide rules, the first variation caused by the operator will cause also at the same time a variation in the indicating pairs, selected as result, of the slide rules containing the same.

In this way the purpose will be attained of the calculating machine according to this invention, consisting in acting on any indicating pair (for any factor of the plurality of equations) and in reading out the corresponding variations in all the indicating pairs, selected as results, of all the other factors, when the relative factors are depending upon the first factor according to the equations of the considered plurality.

The extent of the logarithmic basis and the direction in which the values of the scales increase cause, in co-operation with the extent and the rotation direction of the movements of the second element of an indicating pair transmitted to one or more first elements of subsequent indicating pairs, the transmitted movement to change in accordance with the variations of the exponent of the same factor in the different equations for attaining a correct arrangement of the factors according to the equations of the considered plurality.

Suppose the calculating machine is set up so that the hair line $iM$ (FIG. 6$a$) corresponds to the value 100,000. Moreover, suppose the gears 7 and 3 are mounted so that the cones 6 and 5 (FIG. 2) lock the supports of the plate 211 and of the ring 210, the hair line $ir$ being superposed upon the value 1 of the scale $r$.

According to the form of the factor $r$:

$$r = \sqrt{\frac{2}{fckj}}$$

in which $$k = \frac{n}{n + fs/fc} \text{ and } j = 1 - \frac{k}{3}$$

by having the value $r=1$ the values of $n$, $fs$, $fc$: must be:

$$n = 10; \quad fs = 1400; \quad fc = 18$$

therefore, the hair line $ir$ will be placed in the initial position upon the value 18 of the scale $fs=1400$ of $n=10$.

Suppose the gears 3 and 14, 14 and 15, 21 and 22 are so mounted that the hair line $ip$ of the plate 213 corresponds to the value 100 of the scale $d$ and remains locked in this position, by virtue of the locking between the cones 18 and 20 (FIG. 4).

Moreover, suppose the assembly is so mounted that the hair line $ip$ is located upon the value 10 of the stationary scale $b$.

It might occur that the relative positions of the gears prevent a correct positioning of the above hair lines and render necessary a displacement of one of said lines from the desired main position by an amount comprised in the extent of a tooth. In such a case a "calibration" of the machine will be made by loosing the nut 70 (FIG. 1), disengaging the gears from the scales, correctly placing said hair lines in correspondence of said values of the scales and tightening the nut 70.

Consequently, for the factors of the first equation on the relative scales there will be indicated the following values:

M = 100,000 kg. cm.
    $r=1$ ($n=10$, $fs=1400$, $fc=18$)
    $d=100$ cm.
    $b=10$ cm.

and the first equation will be:

$$b = Mr^2 \frac{d}{d^2} = 100{,}000 \times 1^2 \times \frac{1}{100^2} = 10$$

For simplifying the arrangement, it will be useful to assemble the parts pertaining to the second slide rule at the initial value 1 of the scales $t$ and A$s$.

But this is not possible since also for the factor $t$ there should be maintained the same conditions of $n$, $fs$, $fc$ adopted for the factor $r$, that is $n=10$, $fs=1400$ and $fc=18$.

Therefore, the gears 32 and 37 must be mounted in such a relative position one to another that the hair line $it$ of the plate 216 remains locked upon the value $fc=18$ of the scale $fs=1400$ of $n=10$. This position corresponds, in accordance with said form of the factor $t$:

$$t = \frac{fc}{2fs}\sqrt{\frac{6n}{3fs + 2nfc}}$$

to the value $t=0.00074$. Abstracting from zeros, to this value of the logarithmic scale $t$ it will correspond said position of the hair line *it* upon the value 18 of the scale *t* (for *fs*=1400 and *n*=10). Should 0.00074 be the value of the factor *t*, in accordance with the value *r*=1, also *As* will have a value obviously corresponding to said values assigned to the other factors and depending upon the Equation 2':

$$As = rtM\frac{1}{d} = 1 \times 0.00074 \times 100,000 \times \frac{1}{100} = 0.74$$

and therefore, in the initial position the gear 42 will be mounted so that the hair line *ip*, while indicating on the scale *d* the value 100 and on the scale *b* the value 10, indicates on the scale *As* the value 0.74, corresponding also to 7.4, 74 and so on, since said scale is a usual logarithmic scale.

Also in this case, the gear lands and spaces of the gear wheels may prevent a correct positioning of the hair lines upon the desired values.

The calibration operation will be terminated by unscrewing the nut 71 (FIG. 1*a*) and disengaging the rigid connection of the parts 41 and 38. This connection will be restored by screwing the nut 71, after having brought the hair lines upon said values.

Also in the third slide rule, in the initial position, the hair line *iS* should be placed upon the values *n*, *fs*, *fc* corresponding to those assumed for *r* and *t*, which correspond to the value of *k*=0.114, according to said form of *k*. Thus, in the position selected as initial (*n*=10; *fs*=1400; *fc*=18), the hair line *iS* will lie upon the value 0.114 of the scale assumed for the marking of the scale *k*.

With these initial values, the initial value indicated on the scale *kd* must be in accordance with the Equation 3'

$$kd = kd = 0.114 \times 100 = 11.4$$

Therefore, the scales *k* and *d* will be mounted in such a relative position that while the hair line *iS* indicates on the scales *k* said values *fc*=18, *fs*=1400 and *n*=10 (corresponding to *k*=0.114), the hair line *ip* indicates 100 on the scale *d* and 11.4 on the scale *kd*.

For the fourth slide rule, as initial position there will be selected *Av*=1. Since *Av* is the area of a stirrup, *Av*=1 corresponds to the area of a stirrup (with two branches) made with the steel rods having a diameter of 8 mm. In this case the Equation 5''' for the initial position of *As*=0.74 will be as follows:

$$N = \frac{3}{4/5 Av} AS = \frac{3}{4/5} \times 0.74 = 2.775$$

Therefore, the numbers 226 (FIGS. 6*a*, 7*a*) on the plate 213 will be marked in such a position that while the hair line *ip* indicates the value 0.74 on the scale *As* the hairline *iN*, carried in direction of the value 8 of the numbers 226, indicates on the same scale *As* the value 2.775.

Thus, in the initial position the hair lines will indicate on the corresponding scales the following values—

On the scale M: 100,000 kgcm.
On the scale *r*: *fc*=18 kg./cm.² (*n*=10; *fs*=1400) corresponding to *r*=1
On the scale *d*: 100 cm.
On the scale *b*: 10 cm.
On the scale *t*: *fc* 18 kg./cm.² (*n*=10, *fs*=1400) corresponding to *t*=0.00074
On the scale *As*: 0.74 cm.²
On the scale *k*: *fc* 18 kg./cm.² (*n*=10; *fs*=1400) corresponding to *k*=0.114
On the scale *kd*: 11.4 cm.
On the scale 226 for the factor *Av*: diameter of 8 mm., corresponding to *Av*=1 cm.²
On the scale *As* for the factor N: 2.775 stirrups Suppose we have the following values given by the problem to be solved:

*M*=200,000 kgcm.
*r*=0.4 (*fc*=51, *fs*=1400, *n*=10)
*d*=40 cm.
*t*=0.00195 (*fc*=51, *fs*—1400, *n*=10)
*k*=0.267 (*fc*—51, *fs*—1400, *n*—10)
*Av*=0.57 (stirrups with two branches made of 6 mm. rods)

From the various factors of the fourth equations, the following are unknown:

*b*, *As*, *kd*, N

Since their number corresponds to the number of equations, this problem has a unit solution. Should another of the above factors be unknown, the problem would have an infinite range of solutions.

Suppose the knob 1 is rotated in left hand direction, without pressing it down. Therefore, the gears 3 and 7 (FIG. 2) will rotate together in right-hand direction, whereas the gear 13 and the scale M (FIG. 1) will rotate in left hand direction.

Suppose the rotation is continued till the scale M, having initially the value 100,000 at the hair line *i*M, has below said hair line the value 200,000. Thus the scale M has been rotated in left-hand direction through an angle through which the gears 7 and 3 have been rotated in right-hand direction, whereby the hair line *ir* indicates the value 18 on the scale *r*, corresponding to the value *r*=1. The gear 3 causes the gear 14 to rotate in left hand direction through the same angle and through the same angle also the gear 22 will rotate owing to the connections of the gears 14 and 22 with the gears 15 and 21 (FIG. 4), locked one with another by means of the cones 18 and 20.

The hair line *ip* of the plate 213, rigidly connected to the gear 22, will remain on the initial value 100 of the scale *d*, but has been rotated in left hand direction through the same angle through which the scale M has been rotated in left hand direction from the value 100,000 to the value 200,000. Thus, the hair line *ip* will indicate on the scale *b* finally no more the initial value 10, but a new value 20, since the scale *b* is a left hand scale (that is its values increase in counterclockwise direction) and the scale *b* is, as the scale M, a double scale (that is it consists of two scales arranged on the entire circumference). Thus, the displacement of the scale M has caused a variation of the initial value of the scale *b*, in accordance with the first equation. But the factor M is common also to the second equation and the corresponding indicating pair is common also to the second slide rule, to which pertains the indicating pair for the factor *As*. Should the scale *As* remain stopped, said left hand rotation of the hair line *ip* would increase the initial value indicated on the scale *As*, because also the scale *As* is a left hand scale. But, while on the scale *b* said left hand rotation of the hair line *ip* carries the indicated value from "10" to "2×10," on the scale *As* having as basis not the half circumference but the entire circumference, the same rotation of the hair line *ip* carries the initial value 0.74 not to the value 2×0.74 but to the value $\sqrt{2} \times 0.74$.

However, it is to be noted that the scale *As* does not remain stopped during the rotation of the scale M. The gear 13, rigidly connected with the scale M, meshes (FIG. 1*a*) with the gear 32 and therefore, the gear 32 will rotate in left hand direction through the same angle as the gear 13 and also the gear 37 will rotate through the same angle in left hand direction, owing to the cones 34 and 78 being locked together, as shown in FIG. 3.

Therefore, the scale *t* and the hair line *it*, rigidly connected to the gears 32 and 37, will rotate, but the hair line *it* will indicate always the original value *fc*=18, corresponding to *t*=0.00074. The left-hand rotation of the gear 37 (FIG. 1*a*) will cause the gear 42 and the scale *As* to rotate by the same angle in right-hand direction. Thus, at the end of the operation of the knob 1, the scale *As* has rotated in right hand direction through the same angle through which it has rotated in left hand direction the hair line *ip*, thus further increasing by $\sqrt{2}$ the indicated value, which will be $As=\sqrt{2}\times\sqrt{2}\times 0.74=1.48$.

In this way, the indicating pair *iM—M* has operated two times, the first one as an indicating pair common to the first and second slide rules, thus causing the hair line *ip* to rotate upon the scales *b* and *As*, and the second time as an added indicating pair of the second slide rule, causing the scale *As* to rotate in opposite direction for compensating the difference of logarithmic basis of the scales M and *As*.

In consequence of these movements, in the fourth slide rule the N value indicated by the hair line *iN* (rigid with the hair line *ip*) on the scale *As*, which was 2.775, will be now:

$$N=2\times 2.755=5.55 \text{ stirrups}$$

The variation of the factor M, in the corresponding indicating pair, had caused at the same time the factor *b* to vary in accordance with the Equation 1', the factor *As* to vary in accordance with the Equation 2' and the factor N to vary in accordance with the Equation 5'''.

Before carrying out the selected example, it is to be noted that the variation of the factor M in the indicating pair pertaining to the first slide rule, acts immediately on the factor *b*, the other indicated pairs of the first slide rule remaining at values assigned to the other factors, and should be of interest to read out the corresponding values of M and *b* for selecting the more suitable values thereof at the same time in which the hair line *iM* indicates on the scale M a range of values 100,000; 110,000 . . . ; 120,000 and so on, on the scale *b* there will be indicated the corresponding values 10, 11, 12 . . . and so on, for ranges as large as desired of values as close as desired.

Moreover, it is to be noted, that in both indicating pairs *iM—M* and *ip—b*, the locking of the hair line with the scale is due to the inertia of masses and therefore, for unlocking said hair line and scale it will be sufficient to rotate the knob 1.

However, should this correspondence of values be obtained also for the factor M and f.i. for the factor *d*, it would be necessary to hold pressed down the knob 42 during the rotation of knob 1. Thus the hair line *ip* remains on the initial value of *b*=10 and the left-hand rotation of the scale M from 100,000 to 200,000 causes the scale *d* to rotate by the same amount, the hair line *ip* indicating the value $\sqrt{2}\times 100=141$ on the scale *d* having a double logarithmic basis with respect to the scale M. In effect, this value is the result of the Equation 1' written in the following form:

$$d=r\sqrt{M}\frac{1}{\sqrt{b}}=1\times\sqrt{200,000}\times\frac{1}{\sqrt{10}}=141 \text{ cm.}$$

From the above it is easily deducible that while displacing the scale M within a range of values as close as desired 100,000; 110,000; 120,000 . . . and so on, it will be possible to observe the variations not only on the scale *b* (or on the scale *d*), but also on the scale *As* assigned to the corresponding factors of the other equations.

Suppose the scale M has its value 200,000 at the hair line *iM* and the knob 1 is pressed down, rotating the same in left hand direction. The collar 62 will press the stationary coil spring 64 and the ring 66 against the nut 68, causing the cone 6, the gear 7 and the scale *r* to remain stopped, whereas the cone 5 disengaged from the cone 6 will rotate in left hand direction causing the gear 3 and the hair line *ir* to rotate in right hand direction. The rotation will continue until the hair line *ir* will be carried from the value *fc*=18 to the value *fc*=51 of the scale *fs*=1400 and *n*=10. Since the value of *r* is 0.4, the hair line *ir* has been rotated so as to displace from the value 1, corresponding to 0.1, to the value 0.4.

It is to be noted that the value of *r*=0.4, is given, as the values of *t* and *k* of the problem, by the generally known tables, in correspondence to the conditions of *fc*=51, *fs*=1400, *n*=10, said values being here given only for illustrating the positions requested by the problem, that is *fc*=51, *fs*=1400, *n*=10. In effect, in the corresponding scales are marked only the conditions *fc*, *fs*, *n* and not the relative value of *r*, *t*, *k*. Although said values are referred to, the operator is not obliged to know or to take them in account by operating the machine.

Through the same angle, through which has rotated in right hand direction the gear 3 for displacing the hair line *ir* from value 0.1 to the value 0.4 of *r*, the gear 14 meshing with the gear 3 has been rotated also and the scale *d* and likewise the plate 213 carrying the hair line *ip* will rotate in left hand direction (owing to the rigid connection of the cones 18 and 20 as shown in FIG. 4). Should the scale *r* have the same logarithmic basis of the scale *b* (half circumference), said second displacement of the hair line *ir* would cause the hair line *ip* to travel on the scale *b* from 20 to $4\times 20=80$.

However, since the basis of the scale *r* is double (the entire circumference), this displacement of the hair line *ip* will have on the scale *b* a double effect and therefore, the value on said scale *b*, obtained after the first displacement of the hair line *ip*, due to the displacement of the scale M, from 10 to $2\times 10=20$, will be now $4^2\times 20=320$. But, as referred to at the beginning of this operation the original point of the scale *r* has been supposed as corresponding to 0.1, instead of 1, by dividing *r* by 10. Therefore, the new value of the scale *b* will be:

$$b=0.4^2\times 20=3.20$$

In practice, this calculation is not necessary, because the magnitude order may be perceived by intuition in accordance with the problem data.

The displacement of the hair line *ip* will carry the value to be read out on the scale *As* from 1.48 to $$As=0.4\times 1.48=0.592$$

because the scale *As* has the same logarithmic basis as the scale *r*.

Rigidly rotating with the hair line *ip* is also the hair line *iN*, carrying the value to be read out on the scale N from 5.55 to:

$$N=0.4\times 5.55=2.22 \text{ stirrups}$$

For completing the positioning of the factors of the first equation, in the third indicating pair there must be positioned the other factor given by the problem, namely the factor *d*.

However, it will be preferable to position firstly the other factors. After having carried, by rotating the pressed down knob 1, the hair line *ir* at the value 51 (of *fs*=1400, *n*=10), by means of the pressed down knob 46, the same operation will be repeated in the right hand dial.

By rotating the pressed down knob 46 (FIG. 3), the collar 63 will press the stationary foil spring 65 and the ring 67 against the nut 69, causing the same to remain stopped together with the cone 34, the gear 32 and the scale *t* remaining stopped too. The cone 78 will rotate in right hand direction, whereas the gear 37 and the plate carrying the hair line *it* will rotate in left hand direction. The knob 46 will be rotated to carry the hair line *it* also to the value *fc*=51 for the conditions *fs*=1400, *n*=10 of the scale *t*.

For an exact marking of the scale *t*, this is equivalent to carrying the hair line *it* from the value *t*=0.00074 to *t*=0.00195, corresponding to the new conditions of *fc*, *fs*, *n*. This movement corresponds to a rotation by an amount of log 0.00195—log 0.00074=log 2.63 and thus of $$\frac{0.00195}{0.00074}=2.63$$

on the logarithmic scale of $t$, which rotation is carried out by the hair line $it$ and the gear 37.

The scale $As$ will rotate in right hand direction, owing to the gear 24 (FIG. 1a) meshing with the gear 37. Since during this movement the hair line $ip$ will remain stopped, the value indicated by it on the scale $As$ varies from 0.592 to:

$$As = 2.63 \times 0.592 = 1.55$$

because the scales $t$ and $As$ have the same logarithmic basis, namely the entire circumference.

Therefore, also the value indicated on the scale $As$ by the hair line $iN$ varies from 2.22 to $$N = 2.63 \times 2.22 = 5.84 \text{ stirrups}$$

Now, there will be introduced the new factor $Av$ referring to said problem, namely 0.57, instead of 1, that is to say stirrups made of rods having a diameter of 6 mm. instead of 8 mm.

With a point inserted in one of the bores provided in the plate 222, said plate will be rotated in left hand direction to cause the hair line $iN$ to indicate on the scale 226 (FIG. 6a) the number 6 representing the new desired diameter of the stirrup rods.

Since the scale of numbers 226 has the same basis of the scale $As$ (the whole circumference) but in opposite direction, the displacement of the hair line $iN$ from the number 8 to the number 6 will correspond to a rotation amount of log 1—log 0.57 and then the stirrup number, which before was 5.84, will be now:

$$N = \frac{5.84}{0.57} = 10.24 \text{ stirrups}$$

It is still necessary to position the factor $k$ at the new values of $fc$, $fs$, $n$. By rotating in right-hand direction the knob 48, the pinion 49, ring 50 and plate 222 carrying the hair line $iS$ (FIG. 1) will rotate in left-hand direction. By carrying the hair line $iS$ from the value $fc=18$ to the value $fc=51$ (of the scale $n=10$), the value $k$ varies from $k=0.114$ to $k=0.267$, corresponding to the required condition of $fc=51$. Therefore, the hair line $ip$ placed on the value 100 of $d$, will indicate on the scale $kd$ not 11.4, as in the original position, but the following new value:

$$kd = 0.267 \times 100 = 26.7$$

The introduction in the indicating pairs of the corresponding values given by the problem to be solved occurs irrespectively one of another, and taking advantage of this feature, the factor $d$ will be conveniently introduced at last. Suppose at first that the problem imposes a determined value of $d=40$ cm. The knob 47 will be pressed down and rotated in left-hand direction (FIG. 4). The gears 15 and 14 and the scale $d$ will remain stopped, whereas the gear 21 will rotate in left-hand direction and the gear 22 together with the plate carrying the hair line $ip$ will rotate in right hand direction. The rotation will be continued to carry the hair line $ip$ from the value 100 to the value 40 of the scale $d$, this being equivalent to the multiplication of the original value 100 by 0.4 or to the division by 10 and multiplication by 4. Since the scale $b$ has a direction contrary to the direction of the scale $d$, the displacement of the hair line $ip$ from the value 10 to the value 40 on the scale $d$ will cause the hair line $ip$ to move on the scale $b$ through the same angle with a double effect (owing to the difference of the logarithmic basis of both scales $d$ and $b$) and therefore the value indicated by the hair line $ip$ on the scale $b$ varies from 3.2 cm. to $$b = \frac{3.2}{0.4^2} = 20 \text{ cm.}$$

The same movement of the hair line $ip$ on the scale $As$ having the same basis of the scale $d$, but increasing in opposite direction, will cause the value $As$ to vary from 1.55 to:

$$As = \frac{1.55}{0.4} = 3.87$$

Together with the hair line $ip$ has rotated also the plate 224 carrying the hair line $iN$, which will indicate on the scale $As$ instead of the value 10.24, the new value:

$$N = \frac{10.24}{0.4} = 25.6 \text{ stirrups}$$

Moreover, the same movement, which has caused the hair line $ip$ to move from the value 100 to the value 40, will vary the value of $kd$ on the scale $kd$ from 26.7 to:

$$kd = 0.4 \times 26.7 = 11.3 \text{ cm.}$$

because the scale $kd$ has the same basis and the same direction of the scale $d$.

Thus, the positioning of the new values of the problem for the factors:

$$M, r, t, Av, k, d$$

on the corresponding scales has given the following new values solving the problem in accordance with the four Equations 1', 2', 3', 5''':

$$b = 20 \text{ cm.}$$
$$As = 3.87 \text{ cm.}^2$$
$$kd = 11.3 \text{ cm.}$$
$$N = 25.6 \text{ stirrups}$$

Should the factor $d$ be an unknown, there will be an infinite range of solutions; therefore, there will be also an infinite range of possible and technically exact projects, one of which will be selected by the operator. In this case the operator, instead of carrying the hair line $ip$ (by rotating the pressed down knob 47) at the value 40 of the scale $d$, moves said hair line $ip$ upon all the succession of values, as closed as desired: 35, 30, 25, 20 . . . reading out simultaneously the corresponding values of the factors $b$, $As$, $kd$, N. At the instant in which the hair line $ip$ is at the value 35 of the scale $d$, the operator will be able to read out the following values on the corresponding scales:

$$b=26; As=4.5; kd=9.4; N=30$$

and at the value $d=30$ the operator will be able to read out the following different values:

$$b=35; As=5.2; kd=8; N=35 \text{ and so on}$$

In this way, he will be able to read out quickly within the entire range of values $d$ (or of any other value of unknown factors) an infinite number of complete projects, of which he may select the most suitable one for any value of the other factors. What is above said with reference to the factor $d$ may be applied to any factor selected as unknown in each equation, but obviously only for those factors which depend on the controlled factor in accordance with the equations.

Suppose now that the main condition $$M = \frac{PL}{12}$$

can not now be accepted and must be substituted by the condition $$M = \frac{PL}{8}$$

Moreover, suppose to have $fv = fs$ instead of $fv = 4/5 \, fs$. It will be necessary to introduce a factor $k$ having, as above referred to, the following value:

$$k = \frac{8}{12} \times 0.8 = \frac{6.4}{12}$$

In this case, the plate 229 will be rotated to carry the hair line $iU'$ at the value 6.4 of the scale "$a$" and at the same time by means of the hair line $iU$ on the scale $As$ will be read out the value 13.7 corresponding to that previously obtained (25.7) divided by 12 and multiplied by 6.4 and indicating the new number of stirrups. Should the value of M, d or of any other factor of the problem be now changed, the hair line iU will indicate the corresponding number of stirrups in accordance with the new conditions.

Suppose the reduction of the depth and the other resulting variables is carried out by introducing in the center of gravity of the compressed zone an amount of steel corresponding to 20, 40, 60% of tensile reinforcement area.

The operator displaces the projection 58 (FIGS. 6a, 7a) in right hand direction and rotates in left hand direction the pressed down knob 47. The plate 213 carrying the hair line ip will rotate in left hand direction, indicating always the value 20 on the scale b rotating therewith.

The five hair lines iK marked on the transparent ring 226 rigid with the scale b, will rotate also in left hand direction, each of them moving apart from the value 0 of its scale u. When the hair line iK pertaining to the scale u of $n=10$ (of the example) will be carried from the value 0 to the value 2 (0.2) the hair line ip will indicate on the scale d the value 39, on the scale kd the value 10.5, on the scale As the value 4, whereas the hair line iN will indicate on the same scale As the value 27. Continuing the rotation of the knob 47, while the hair line iK indicates 4; 6 (0.4–0.6), the operator will be able to read out the corresponding variations of the above factors.

Suppose now the calculating machine is used for the second plurality of equations.

For the problem giving the following data: $M=200,000$ kgcm., $fc=51$, $fs=1400$, $n=10$, stirrup diameter 6 mm. and $d=40$ cm., there have been already calculated the following values relating to the "primitive" section:

$b=20$ cm.; $As=3.87$ cm.²; $dk=11.3$ cm.; $N=25.6$ stirrups and suppose to wish known the area steel As′ to be arranged in the compressed zone for reducing the width b (20 cm.) by the quantity $b°=5, 6, 7 \ldots$ cm., and the reductions to be carried out in the tensile reinforcement area As (3.87 cm.²). In the scales F′ and Cr of the ring S or of the table 223 there are marked in correspondence to the values of $fc=51$ ($fs=1400$, $n=10$), the values $F'=0.28$, $Q=0.006$. The operator rotates by means of a point the plate 224 so as to cause the scale a, rigid therewith, to indicate at the hair line ip the value read out for $F'=0.28$ (coincident with 2.8, 28 and so on). In this way, as the hair line ip will indicate a value on the scale As, the hair line iN, marked on the plate 224 in correspondence to the initial point of the logarithmic scale "a" will indicate on the same scale As the same value of the hair line ip divided by 0.28 in accordance with the Equation 7′ corresponding to third equation of the second plurality. The operator rotates also the plate 229 so as to cause the hair line iU to move to the value $Q=0.006$ (coincident with 6) of the scale "a." It will be obvious that for any value indicated by the hair line iN on the scale As, the hair line iU will indicate on the same scale the same value multiplied by 0.006 in accordance with the Equation 8′, corresponding to the fourth equation of the second plurality.

Should the operator now rotate the knob 1, without pressing it down, so as to cause the hair line ip to indicate on the scale b the value of $b°=5$, the scale M will move simultaneously to indicate at the hair line iM the value $M°=50,000$, whereas the hair line ip will indicate on the scale As the value $A°=0.97$, these amounts being bound to one another by the Equations 1′ and 2′. Said values of M° and A° may be possibly neglected, but it may be of interest to read out on the scale As at the hair line iN the value:

$$As' = \frac{A°}{F'} = \frac{0.97}{0.28} = 3.47 \text{ cm.}^2$$

or on the same scale at the hair line iU the value:

$$Cr = As' \, Q = 3.47 \times 0.006 = 0.21 \text{ cm.}^2$$

By rotating the knob 1, without pressing it down, so as to cause the hair line ip to indicate on the scale b the value $b°=6.7$, 8 cm., the hair lines iN and iU will indicate on the scale As respectively: 4.1 and 0.25; 4.9 and 0.29; 5.6 and 0.33 and so on, thus making it possible to read out all the resulting values of the project and to select then the most suitable one.

I claim:

1. A logarithmic calculating machine for the simultaneous solution of a plurality of equations interdependent upon each other owing to factors appearing in more than one equation, comprising a base, a first slide rule for a first equation mounted on said base including a transparent plate secured to said base carrying a first hairline, a first hollow shaft perpendicularly secured to said base, a first element rotating around said hollow shaft carrying a first logarithmic scale, said first hair line and said first scale forming a first indicating pair assigned to a first factor of said first equation, a second shaft perpendicularly secured to said base, a second element rotating around said second shaft carrying a second logarithmic scale, means transferring the rotating motion of said first to said second element, a third element rotating around said second shaft carrying a second hair line, said second scale and said second hair line forming a second indicating pair assigned to a second factor of said first equation, locking means for locking said third and second element, disengaging means for disengaging said locking means during the rotation of said third and second element with respect to one another, a fourth element rotating around said first shaft carrying a third logarithmic scale, means transferring the rotary motion of said third element to said fourth element, a fifth element rotating around said first shaft carrying a third hair line, said third scale and said third hair line forming a third indicating pair assigned to a third factor of said first equation, locking means locking said fourth and said fifth element, disengaging means for disengaging said locking means during the rotation of said fourth and fifth element with respect to one another, a fourth hair line carried on said fifth element, a fourth logarithmic scale secured to said base, said fourth hair line indicating on said fourth scale the amount of displacements indicated in said three indicating pairs, said fourth hair line and said fourth scale forming a fourth indicating pair assigned to a fourth factor of said first equation, a second slide rule for a second equation including said first, second and third indicating pairs assigned to factors common for the first and second equation and having a fifth hair line carried on said fifth element, a sixth element rotating around said first shaft, and carrying a fifth logarithmic scale, said fifth hair line and said fifth scale forming a fifth indicating pair corresponding to said fourth indicating pair of said second slide rule and assigned to a fourth factor of said second equation, a third shaft perpendicularly secured to said base, a seventh elecent rotating around said third shaft carrying a sixth hair line, transferring means for transferring the rotary motion of said sixth element and said seventh element from one to another, an eighth element rotating around said third shaft carrying a sixth logarithmic scale, said sixth hair line and said sixth scale forming a sixth indicating pair of the machine corresponding to said fifth indicating pair of said second slide rule and assigned to the fifth factor of said second equation, locking means for locking said seventh element and said eighth element, disengaging means for disengaging said locking means during the rotary motion of said seventh and eighth elements, transferring means for transferring the rotary motion of said eighth element to said first element; a third slide rule for a third equation of said plurality including said third indicating pair of said first slide rule, assigned to the factor common for said first and third equation and having a seventh hair line carried on said fifth rotating element, said fourth element having a concentric circular groove, a ring rotatably mounted outwardly of said third scale in said concentric circular groove carrying a seventh logarithmic scale, said seventh hair line and said seventh scale forming a seventh indicating pair corresponding to said second indicating pair of said third slide rule and assigned to the second factor of said third equation of said plurality, an eighth hair line carried on said ring, an eighth logarithmic scale carried on said fourth element concentrically mounted on said ring, said eighth hair line and said eighth scale forming an eighth indicating pair corresponding to said third indicating pair of said third slide rule and assigned to the third factor of the third equation, a fourth slide rule including said fourth indicating pair of said second slide rule, assigned to the fourth factor of the second equation, common to the second and fourth equation, and having a ninth logarithmic scale carried on said sixth element, a hub axially projecting from said fifth element, a circular transparent plate rotatably mounted on said hub carrying a ninth hair line, said ninth scale and said ninth hair line forming a ninth indicating pair corresponding to said second indicating pair of said fourth slide rule, a tenth hair line on said circular transparent plate, a tenth logarithmic scale carried on said fifth element, said tenth hair line and said tenth scale forming a tenth indicating pair corresponding to said third indicating pair of said fourth slide rule and assigned to the third factor of said fourth equation.

2. A logarithmic calculating machine as set forth in claim 1, wherein all of said transferring means comprise two gears coupled to the cooperating elements and disconnecting means are provided for disconnecting said gears from said elements.

3. A logarithmic calculating machine as set forth in claim 2, wherein said disconnecting means comprise friction couplings having conical coupling surfaces and means are provided for releasing exteriorly said friction couplings ot locate the hair lines at predetermined original positions.

4. A logarithmic calculating machine as set forth in claim 1, wherein said locking means comprise a hollow cone, a cone cooperating with said hollow cone, one of said cones being connected with a scale and the other with a hair line, a coil spring bearing on said base and pressing said cooperating cone against said hollow cone, said disengaging means comprising a control knob secured to said cooperating cone, said control knob being pivotable around its axis and axially movable against the action of said spring for disengaging said cones from each other.

5. A logarithmic calculating machine as set forth in claim 4, comprising braking means comprising a collar located underneath said control knob and axially displaceable together with said knob, a flat spring secured to said base urged by said collar against one of said two elements for preventing rotation thereof during the rotary motion of said other element.

6. A logarithmic calculating machine as set forth in claim 1, comprising a cylindrical cup fixed to said base, an elastic split ring disposed in and fitting said cup, unlocking means for unlocking said elastic ring from said cup, a transparent plate having an eleventh hair line secured to said ring carrying said fourth scale, an eleventh logarithmic scale carried on the edge of said cup, said eleventh scale and said eleventh hair line forming an eleventh indicating pair corresponding to said fifth indicating pair of said first slide rule, said eleventh indicating pair being assigned to an additional factor of said first equation.

7. A logarithmic calculating machine as set forth in claim 6, wherein said unlocking means comprise an external ring having a control projection, a sliding shoe fixed to the inner wall of said external ring, said split ring having a slot extending over its ends, two pins vertically projecting into said slot of said split ring, a lever having two vertical bores located in said slot of said split ring, said two pins extending into said two bores of said lever, an internal ring connected to said fifth element located in said split ring, a horizontal pin projecting from the inner wall of said external ring extending into said slot of said split ring so that upon rotating said external ring said sliding shoe pushes said lever thereby causing said split ring to be compressed and disengage from said cup and to adhere to said internal ring and said horizontal pin obliging said external ring to follow the rotating movement of said split ring.

8. A logarithmic calculating machine as set forth in claim 6, comprising an additional transparent plate rotatably mounted on said hub above said plate carrying said tenth hair line and carrying a twelfth hair line and a thirteenth hair line, said twelfth hair line and said ninth scale forming a twelfth indicating pair replacing said ninth indicating pair, a thirteenth logarithmic scale fixed to said plate carrying said tenth hair line, said thirteenth hair line and said thirteenth scale forming a thirteenth indicating pair of the calculating machine corresponding to the fourth additive indicating pair of said fourth slide rule assigned to an additive factor of said fourth equation of the plurality, said twelfth and thirteenth indicating pairs forming together with said ninth indicating pair a fifth slide rule branched off on said fourth slide rule, said fifth slide rule in cooperation with said first, second and fourth slide rules solving a second plurality of equations for calculating other factors of a section of reinforced concrete.

9. A logarithmic calculating machine as set forth in claim 6, wherein the scales of factors depending on the unitary tension of the reinforcement and concrete consist of a plurality of scales marked on the same support, each scale being assigned to a value of the unitary tension of the reinforcement and increasing with increase of the unitary tension of the concrete, said plurality of scales being indicated by a central hair line and by two cooperating hair lines marked on the same support on both sides of said central hair line, which lateral hair lines indicate on said scales respectively double and half values of the unitary tension of the reinforcement.

References Cited in the file of this patent

UNITED STATES PATENTS

| | | |
|---|---|---|
| 2,358,309 | Batori | Sept. 19, 1944 |
| 2,454,987 | Bradner | Nov. 30, 1948 |
| 2,658,671 | Allais | Nov. 10, 1953 |

FOREIGN PATENTS

| | | |
|---|---|---|
| 720,986 | Germany | May 21, 1942 |